United States Patent
Guo et al.

(10) Patent No.: US 12,493,406 B2
(45) Date of Patent: Dec. 9, 2025

(54) VIRTUAL INPUT ELEMENT DISPLAY METHOD, ELECTRONIC DEVICE, AND READABLE STORAGE MEDIUM

(71) Applicant: HUAWEI TECHNOLOGIES CO., LTD., Guangdong (CN)

(72) Inventors: Zhenyu Guo, Shanghai (CN); He Wang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 18/682,271

(22) PCT Filed: Aug. 3, 2022

(86) PCT No.: PCT/CN2022/109821
§ 371 (c)(1),
(2) Date: Feb. 8, 2024

(87) PCT Pub. No.: WO2023/016302
PCT Pub. Date: Feb. 16, 2023

(65) Prior Publication Data
US 2025/0130712 A1    Apr. 24, 2025

(30) Foreign Application Priority Data
Aug. 9, 2021  (CN) .......................... 202110911918.1

(51) Int. Cl.
*G06F 3/048*      (2013.01)
*G02B 27/01*     (2006.01)
(Continued)

(52) U.S. Cl.
CPC ..... *G06F 3/04886* (2013.01); *G02B 27/0172* (2013.01); *G06F 3/0426* (2013.01); *G02B 2027/0187* (2013.01); *G02B 2207/101* (2013.01)

(58) Field of Classification Search
CPC .... G06F 3/012; G06F 3/0426; G06F 3/04886; G06F 3/011; G06F 3/017; G06F 3/0425;
(Continued)

(56) References Cited

U.S. PATENT DOCUMENTS 11,507,181 B2 * 11/2022 Akamatsu ........... G06F 3/04842
2008/0291158 A1 * 11/2008 Park ........................ G06F 3/014
                                                                  345/156
(Continued)

FOREIGN PATENT DOCUMENTS

| CN | 107633551 A | 1/2018 |
|---|---|---|
| CN | 109683667 A | 4/2019 |
| WO | 2021046162 A1 | 3/2021 |

OTHER PUBLICATIONS

Extended European Search Report in European Appln. No. 22855285.7, mailed on Oct. 2, 2024, 13 pages.
(Continued)

*Primary Examiner* — Olga V Merkoulova
(74) *Attorney, Agent, or Firm* — Fish & Richardson P.C.

(57) ABSTRACT

This application disclose a method and an electronic device. One example method includes: When a hand is located in a detection range of a depth detector, and the hand approaches a physical surface or when the hand is placed on the physical surface, a head mounted display device displays a virtual hand and a virtual keyboard in virtual space. The head mounted display device displays typed information in an interface of the virtual space in response to a typing operation of the finger of the hand. A size of the hand is positively correlated with a dimension of the virtual keyboard. When the hand is of a first size, the dimension of the virtual keyboard is a first dimension. When the hand is of a second size, the dimension of the virtual keyboard is a second dimension, where the first size is greater than the second size.

20 Claims, 14 Drawing Sheets

(51) Int. Cl.
*G06F 3/042* (2006.01)
*G06F 3/04886* (2022.01)

(58) Field of Classification Search
CPC ............... G06F 3/048; G02B 27/0172; G02B 2207/101; G02B 2027/0187
See application file for complete search history.

(56) References Cited

U.S. PATENT DOCUMENTS

| | | | | |
|---|---|---|---|---|
| 2010/0156787 | A1* | 6/2010 | Katayama | G02B 27/017 345/157 |
| 2010/0156836 | A1* | 6/2010 | Katayama | G01S 5/16 345/173 |
| 2014/0168083 | A1* | 6/2014 | Ellard | G06F 3/041 345/168 |
| 2015/0293694 | A1* | 10/2015 | Bozzini | G06F 3/0219 715/773 |
| 2015/0301740 | A1* | 10/2015 | Bozzini | G06F 3/0486 715/773 |
| 2017/0083104 | A1* | 3/2017 | Namba | G06F 3/0219 |
| 2020/0326847 | A1* | 10/2020 | Wang | G06F 3/0304 |
| 2021/0065455 | A1* | 3/2021 | Beith | G06F 3/011 |
| 2021/0173473 | A1* | 6/2021 | Akamatsu | G06F 3/04842 |

OTHER PUBLICATIONS

International Search Report and Written Opinion in International Appln. No. PCT/CN2022/109821, mailed on Sep. 1, 27, 2022, 15 pages (with English Translation).

\* cited by examiner

FIG. 1
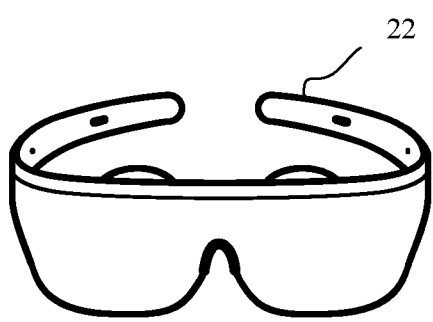
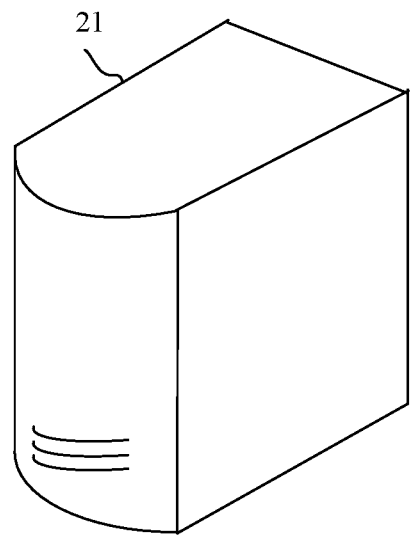
FIG. 2A

VIRTUAL INPUT ELEMENT DISPLAY METHOD, ELECTRONIC DEVICE, AND READABLE STORAGE MEDIUM

CROSS-REFERENCE TO RELATED APPLICATIONS

This application is a national stage of International Application No. PCT/CN2022/109821, filed on Aug. 3, 2022, which claims priority to Chinese Patent Application No. 202110911918.1, filed on Aug. 9, 2021. Both of the aforementioned applications are hereby incorporated by reference in their entireties.

TECHNICAL FIELD

This application relates to the field of computer technologies, and in particular, to a virtual input element display method, an electronic device, and a computer-readable storage medium.

BACKGROUND

With continuous development of science and technology, there are an increasing number of scenarios in which information is input by using a virtual input element.

For example, in scenarios such as virtual reality (VR), augmented reality (AR), and mixed reality (MR), a user enters text information by using a virtual keyboard displayed by an electronic device. In this case, the virtual input element is a key in the virtual keyboard.

SUMMARY

Embodiments of this application provide a virtual input element display method, an electronic device, and a computer-readable storage medium, to improve recognition accuracy of gesture input.

According to a first aspect, an embodiment of this application provides a virtual input element display method, applied to a head mounted display device, where the head mounted display device includes a depth detector and a display component, and the method includes: when a hand is located in a detection range of the depth detector, and in a process in which the hand approaches a physical surface or when the hand is placed on the physical surface, displaying a virtual hand and a virtual keyboard in virtual space by using the display component, where the virtual hand and the virtual keyboard are located in a same plane, and the virtual hand is a virtual model of the hand; and when a finger of the hand is in contact with the physical surface, displaying typed information in an interface of the virtual space in response to a typing operation of the finger of the hand.

A size of the hand is positively correlated with a dimension of the virtual keyboard; when the hand is of a first size, the dimension of the virtual keyboard is a first dimension; and when the hand is of a second size, the dimension of the virtual keyboard is a second dimension, where the first size is greater than the second size, and the first dimension is greater than the second dimension.

In this embodiment of this application, the size of the hand of a user is related to the dimension of the displayed virtual keyboard, that is, a larger size of the hand of the user indicates a larger dimension of the virtual keyboard; and a larger dimension of the virtual keyboard indicates a larger distance between keys in the virtual keyboard. In this way, when the user uses the virtual keyboard to perform gesture input, because the distance between the keys is large, an interval between fingers of the user is also large. If the interval between the fingers is large, a probability that the fingers block each other is low, thereby improving recognition accuracy of gesture input.

For example, in a VR office scenario, after the head mounted display device displays the virtual keyboard in the virtual space, the user may perform a tapping operation (namely, a typing operation) on a physical surface by using a physical hand. The head mounted display device obtains corresponding input information by recognizing gesture input, and displays information corresponding to the typing operation in an interface. For example, if the user "taps in simulation" a key in the virtual keyboard, corresponding information is displayed in an interface input box.

In some possible implementations of the first aspect, after the displaying a virtual keyboard in virtual space by using the display component, the method further includes: when the finger of the hand is in contact with the physical surface, sending a prompt instruction to a target device or performing a prompt operation, where the prompt instruction instructs the target device to perform the prompt operation, where the prompt operation includes vibration and/or playing a preset sound.

The target device includes the head mounted display device, or an electronic device in communication connection with the head mounted display device.

In this implementation, when the finger of the hand is in contact with the physical surface, it may be considered that gesture input is successful. When gesture input is successful, the user is prompted, through vibration and/or playing a preset sound, that gesture input is successful, and the user does not need to determine, through vision, that gesture input is successful, thereby improving input efficiency of the user. In addition, when the prompt operation is vibration, a "feeling on the hand" may be provided to the user, and user experience is higher.

In some possible implementations of the first aspect, after the displaying a virtual keyboard in virtual space by using the display component, the method further includes: when a blocking proportion is a first proportion, increasing the dimension of the virtual keyboard; and when the blocking proportion is a second proportion and an input speed is a first speed, decreasing the dimension of the virtual keyboard, where the virtual keyboard is used for gesture input, the blocking proportion is a ratio of a quantity of times for which gesture input is blocked to a total quantity of gesture input times, and the first proportion is greater than the second proportion.

In this implementation, when the user uses the virtual keyboard to perform gesture input, the dimension of the virtual keyboard is dynamically adjusted based on the blocking proportion and the input speed, to dynamically adjust the distance between the keys in the virtual keyboard, so that a key distance adapts to the size of the hand of the user, thereby further improving gesture input efficiency and gesture recognition accuracy.

In some possible implementations of the first aspect, after the displaying a virtual keyboard in virtual space by using the display component, the method further includes: removing the virtual keyboard in a process in which the hand moves away from the physical surface, and/or when the hand is located outside the detection range of the depth detector.

In this implementation, when a specific condition is met, the head mounted display device automatically disables a gesture input function, and automatically removes the virtual keyboard, so that the user does not need to remove the virtual keyboard by performing a complex manual operation, and user operations are more convenient and experience is higher.

In some possible implementations of the first aspect, when the hand is located in the detection range of the depth detector, and in the process in which the hand approaches the physical surface or when the hand is placed on the physical surface, the displaying a virtual hand and a virtual keyboard in virtual space by using the display component includes: when the hand is located in the detection range of the depth detector, and in the process in which the hand approaches the physical surface or when the hand is placed on the physical surface, obtaining a hand depth map of the hand by using the depth detector; processing the hand depth map to obtain a hand parameter, where the hand parameter is used to describe the size of the hand; searching a hand model database for a target hand model matching the hand parameter; obtaining a virtual keyboard parameter corresponding to the target hand model, where the virtual keyboard parameter includes a keyboard dimension; and displaying the virtual keyboard in the virtual space based on the virtual keyboard parameter by using the display component.

According to a second aspect, an embodiment of this application provides a virtual input element display method, applied to an electronic device, where the method includes: when a hand is in a detection range of a detector, displaying at least two virtual input elements by using a display component, where a size of the hand is positively correlated with a distance between center points of adjacent virtual input elements; when the hand is of a first size, the distance between the center points of the adjacent virtual input elements is a first distance; and when the hand is of a second size, the distance between the center points of the adjacent virtual input elements is a second distance, where the first size is greater than the second size, and the first distance is greater than the second distance.

It can be seen from the foregoing that a larger size of a hand of a user indicates a larger distance between center points of adjacent virtual input elements. In this way, when the user uses the virtual input element to perform gesture input, because the distance is large, an interval between fingers of the user during gesture input is large. If the interval between the fingers is large, a probability that the fingers block each other is low, thereby improving recognition accuracy of gesture input.

In some possible implementations of the second aspect, when the hand is located in the detection range of the detector, and a distance between the hand and a physical surface is a third distance, at least two virtual input elements are displayed by using the display component. The electronic device is a head mounted display device, and the head mounted display device includes the detector and the display component. Alternatively, the electronic device is a projection device, the projection device includes the detector and the display component, and the display component is a projection component.

In this implementation, it is determined whether a preset enabling condition is met, and when the preset enabling condition is met, a gesture input function is automatically enabled, to automatically display a corresponding virtual input element based on the size of the hand. In this way, the user does not need to enable the gesture input function by using a complex operation, so that the operation is more convenient and user experience is higher.

In some possible implementations of the second aspect, when the distance between the hand and the physical surface is a fourth distance, and/or the hand is located outside the detection range of the detector, the at least two virtual input elements are removed.

In this implementation, whether a preset disabling condition is met is determined, and when the preset disabling condition is met, the gesture input function is automatically disabled, to automatically remove the virtual input element. In this way, user operations are more convenient and user experience is higher.

In some possible implementations of the second aspect, after the displaying at least two virtual input elements by using a display component, the method further includes: when a finger of the hand is in contact with the physical surface, sending a prompt instruction to a target device or performing a prompt operation, where the prompt instruction instructs the target device to perform the prompt operation, where the target device includes the head mounted display device or an electronic device in communication connection with the head mounted display device.

In this implementation, when gesture input is successful, input feedback is automatically provided to the user, so that the user does not need to determine, through vision, that gesture input is successful, thereby improving input efficiency of the user.

In some possible implementations of the second aspect, the prompt operation includes vibration and/or playing a preset sound. When the prompt operation is vibration, when gesture input is successful, a "feeling on the hand" may be provided to the user, and user experience is higher.

In some possible implementations of the second aspect, when the finger of the hand is in contact with the physical surface, before the sending a prompt instruction to a target device, the method further includes: when the physical surface is detected and the physical surface includes the target device, entering a step of sending the prompt instruction to the target device when the finger of the hand is in contact with the virtual input element.

In this implementation, when a specific condition is met, the input feedback function is automatically enabled, and user experience is higher.

In some possible implementations of the second aspect, after the displaying at least two virtual input elements by using a display component, the method further includes: when a blocking proportion is a first proportion, increasing a distance between the virtual input elements; and when the blocking proportion is a second proportion and an input speed is a first speed, decreasing the distance between the virtual input elements, where the virtual input element is used for gesture input, the blocking proportion is a ratio of a quantity of times for which gesture input is blocked to a total quantity of gesture input times, and the first proportion is greater than the second proportion.

In this implementation, when the user uses the virtual input element to perform gesture input, the distance between the center points of the virtual input elements is dynamically adjusted based on the blocking proportion and the input speed, so that the distance adapts to the size of the hand of the user, thereby further improving gesture input efficiency and gesture recognition accuracy.

In some possible implementations of the second aspect, an obtaining process of the blocking proportion and the input speed includes: collecting statistics on a total quantity of gesture input times and a quantity of times for which gesture input is blocked in a preset time period; obtaining the blocking proportion based on the total quantity of gesture input times and the quantity of times for which gesture input is blocked; collecting statistics on a total quantity of characters successfully entered by using the virtual keyboard in the preset time period; and obtaining the input speed based on the total quantity of characters and the preset time period.

In some possible implementations of the second aspect, when the hand is located in the detection range of the detector, the displaying at least two virtual input elements by using a display component includes: obtaining hand data of the hand by using the detector; processing the hand data to obtain a hand parameter, where the hand parameter is used to describe the size of the hand; searching a hand model database for a target hand model matching the hand parameter; obtaining a parameter of a virtual input element corresponding to the target hand model, where the parameter of the virtual input element includes a parameter used to describe the distance between the virtual input elements; and displaying the at least two virtual input elements based on the parameter of the virtual input element by using the display component.

In some possible implementations of the second aspect, the detector includes an image sensor (for example, a binocular camera), and the hand data is a hand image. In this case, the processing the hand data to obtain a hand parameter includes: processing the hand image to obtain key point information of the hand; and obtaining a size of a palm of the hand and a length of each finger based on the key point information of the hand, where the hand parameter includes the size of the palm and the length of each finger.

In some possible implementations of the second aspect, the virtual input element is a key in the virtual keyboard; and the obtaining a parameter of a virtual input element corresponding to a target hand model includes: obtaining a virtual keyboard parameter corresponding to the target hand model, where the virtual keyboard parameter includes at least one of the following: a keyboard dimension, a distance between keys, and an area of a single key.

In some possible implementations of the second aspect, the size of the hand is positively correlated with a dimension of the virtual keyboard, and the dimension of the virtual keyboard is positively correlated with a size of each key in the virtual keyboard; and when the virtual keyboard is of a first dimension, a distance between keys in the virtual keyboard is a first distance; and when the virtual keyboard is of a second dimension, the distance between the keys in the virtual keyboard is a second distance.

In some possible implementations of the second aspect, the electronic device includes a detector and a display component; or the electronic device and the display component are used together, the display component is a head mounted display device, the detector is integrated into the head mounted display device, and the electronic device is, for example, a mobile phone, a host, or a cloud.

According to a third aspect, an embodiment of this application provides a virtual input element display method, where the method is applied to an electronic device, and the method includes: obtaining hand data; processing the hand data to obtain a hand parameter, where the hand parameter is used to describe a size of a hand; determining a parameter of a virtual input element based on the hand parameter, where the parameter of the virtual input element includes a parameter used to describe a distance between center points of adjacent virtual input elements; and displaying the virtual input element based on the parameter of the virtual input element.

The size of the hand is positively correlated with the distance between the center points of the adjacent virtual input elements.

When the hand is of a first size, the distance between the center points of the adjacent virtual input elements is a first distance; and when the hand is of a second size, the distance between the center points of the adjacent virtual input elements is a second distance, where the first size is greater than the second size, and the first distance is greater than the second distance.

In some possible implementations of the third aspect, after the displaying the virtual input element based on the parameter of the virtual input element, the method further includes:
  determining a blocking proportion and an input speed of gesture input in a preset time period, where the virtual input element is used for gesture input, and the blocking proportion is a ratio of a quantity of times for which gesture input is blocked to a total quantity of gesture input times;
  when the blocking proportion is greater than or equal to a first threshold, increasing the distance between the center points of the adjacent virtual input elements; and
  when the input speed is less than or equal to a second threshold and the blocking proportion is less than or equal to a third threshold, decreasing the distance between the center points of the adjacent virtual input elements, where the third threshold is less than the first threshold.

In some possible implementations of the third aspect, before the obtaining hand data, the method further includes: detecting whether a VR controller is in a static state; and detecting whether a distance between the hand and a target physical surface is less than a first distance threshold, where the target physical surface is a physical surface closest to an image collection apparatus of the electronic device; and
  when the VR controller is in the static state, and the distance between the hand and the target physical surface is less than the first distance threshold, determining that a preset enabling condition is met, and entering a step of obtaining the hand data.

When the VR controller is in a non-static state, and/or the distance between the hand and the target physical surface is greater than or equal to the first distance threshold, it is determined that the preset enabling condition is not met.

In some possible implementations of the third aspect, after the displaying the virtual input element based on the parameter of the virtual input element, the method further includes: detecting that the distance between the hand and the target physical surface is greater than a second distance threshold, and removing the virtual keyboard.

In some possible implementations of the third aspect, after the displaying the virtual input element based on the parameter of the virtual input element, the method further includes: detecting whether gesture input is successful, where the virtual input element is used for gesture input; and
  when gesture input is successful, sending a prompt instruction to a target device, where the prompt instruction instructs the device to perform a prompt operation. The prompt operation includes vibration and/or playing a preset sound.

In some possible implementations of the third aspect, the virtual input element is a key in a virtual keyboard, the parameter of the virtual input element is a virtual keyboard parameter, and the virtual keyboard parameter includes at least one of the following: a keyboard dimension, a distance between center points of adjacent keys, and an area of a single key. The size of the hand is positively correlated with a dimension of the virtual keyboard, or the dimension of the virtual keyboard is positively correlated with a size of each key in the virtual keyboard.

According to a fourth aspect, an embodiment of this application provides an electronic device, including a memory, a processor, and a computer program that is stored in the memory and that can be run on the processor. When executing the computer program, the processor implements the method according to any one of the first aspect, the second aspect, or the third aspect.

According to a fifth aspect, an embodiment of this application provides a computer-readable storage medium. The computer-readable storage medium stores a computer program. When the computer program is executed by a processor, the method according to any one of the first aspect, the second aspect, or the third aspect is implemented.

According to a sixth aspect, an embodiment of this application provides a chip system, the chip system includes a processor, the processor is coupled to a memory, the processor executes a computer program stored in the memory, to implement the method according to any one of the first aspect, the second aspect, or the third aspect. The chip system may be a single chip or a chip module including a plurality of chips.

According to a seventh aspect, an embodiment of this application provides a computer program product. When the computer program product runs on an electronic device, the electronic device is enabled to perform the method according to any one of the first aspect, the second aspect, or the third aspect.

It may be understood that for beneficial effects of the second aspect to the seventh aspect, refer to related descriptions in the first aspect or the second aspect. Details are not described herein again.

BRIEF DESCRIPTION OF DRAWINGS

FIG. 1 is a schematic diagram of blocking of fingers according to an embodiment of this application;

FIG. 2A is a schematic diagram of a VR system according to an embodiment of this application;

DESCRIPTION OF EMBODIMENTS

Figure 2B:
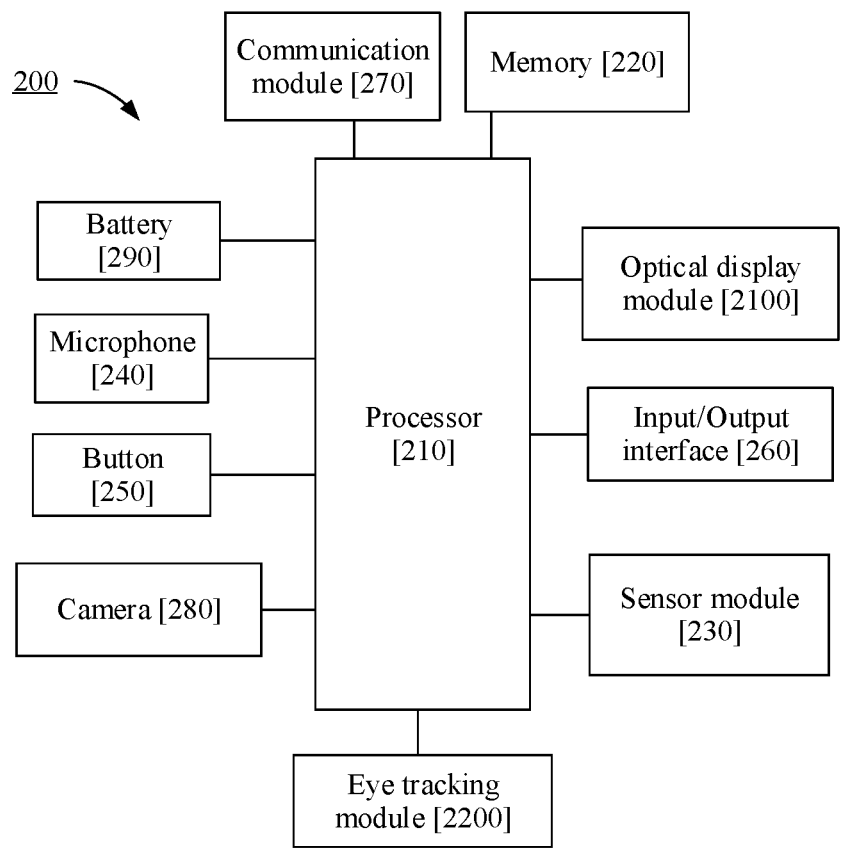
FIG. 2B is a schematic block diagram of a hardware structure of a head mounted device 200 according to an embodiment of this application.

In embodiments of this application, the terms "first", "second", "third", and "fourth" are merely intended for a purpose of description, and shall not be understood as an indication or implication of relative importance or an implicit indication of a quantity of indicated technical features. Therefore, a feature limited by "first", "second", "third", or "fourth" may explicitly or implicitly include one or more features. In addition, it should be understood that at least one in embodiments of this application includes one or more, where a plurality of means two or more.

The term "and/or" in embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Currently, when an electronic device displays a virtual input element, a distance between virtual input elements is preset and fixed. For example, in a VR scenario, when a user needs to use a virtual keyboard to enter information, a head mounted device generates a virtual keyboard of a fixed dimension in virtual space, and displays the virtual keyboard in the virtual space. The dimension of the virtual keyboard is fixed, and a distance between keys in the virtual keyboard is fixed, that is, a distance between virtual input elements is fixed.

In other words, regardless of a size of a hand of the user, the dimension of the virtual keyboard is fixed, and the distance between the keys in the virtual keyboard is also fixed. That is, the distance between the virtual input elements is irrelevant to the size of the hand of the user, and the distance between the virtual input elements does not change with the size of the hand of the user.

In a long-term research process, the inventor finds that a distance between virtual input elements is fixed, and when a hand of a user is large and/or a distance between virtual input elements is small, a problem that fingers block each other occurs.

Because the fingers block each other, an electronic device cannot accurately recognize a location of the finger in a virtual input area, and therefore cannot accurately recognize a virtual input element "pressed in simulation" by the user, resulting in low accuracy of recognizing an input gesture.

For example, in a VR scenario, after wearing a head mounted device (for example, VR glasses), a user may start a virtual keyboard by using a button or a menu. In response to a user operation, the head mounted device displays a virtual keyboard of a fixed dimension in virtual space based on a preset virtual keyboard dimension. After the head mounted device displays the virtual keyboard in the virtual space, the user may "press in simulation" a key in the virtual keyboard by using a finger, to enter corresponding information.

In a process in which the user enters the information by using the virtual keyboard, the head mounted device continuously photographs a plurality of frames of hand images of the user by using a built-in camera from a top-down angle. Based on the plurality of consecutive frames of hand images, the head mounted device recognizes a finger location by using a gesture recognition algorithm, to recognize a key "pressed in simulation" by the user, and further recognizes an input gesture to obtain input information of the user.

In the hand image photographed from the top-down angle, when a dimension of the virtual keyboard is small and/or a size of a hand of the user is large, fingers in the hand image block each other, and consequently the head mounted device cannot accurately recognize the finger location based on the hand image. For example, refer to a schematic diagram of mutual blocking of fingers shown in FIG. 1. When the user performs an input operation based on a virtual keyboard 11 displayed in the virtual space, the built-in camera of the head mounted device photographs an image shown in FIG. 1 from the top-down angle. In FIG. 1, two fingers of a left hand 12 block each other, which is specifically shown in a dashed line area in FIG. 1. The head mounted device cannot accurately recognize a finger location based on the hand image in FIG. 1, and consequently, recognition accuracy of an input gesture is low.

For the problem mentioned above, an embodiment of this application provides a virtual input element display solution. In this solution, a distance between virtual input elements changes with a size of a hand, to reduce or even eliminate a problem of mutual blocking between fingers, thereby improving recognition accuracy of an input gesture.

For example, in a VR scenario, a head mounted device displays virtual keyboards of different dimensions based on different sizes of the hand of the user. A distance between keys in the virtual keyboard varies with the dimension of the virtual keyboard.

The following describes the virtual input element display solution provided in this embodiment of this application in detail with reference to the accompanying drawings. In the following description, for illustration instead of limitation, specific details such as a particular system structure and a technology are provided to facilitate a thorough understanding of embodiments of this application.

To better describe the technical solution provided in this embodiment of this application, the following first describes related content that may be used in this embodiment of this application. For ease of description, the following uses an example in which the electronic device is a head mounted device (for example, VR, AR, or MR). In another embodiment, the electronic device may be a projection device or the like.

(1) Virtual Input Area and Virtual Input Element

The virtual input area includes at least one virtual input element. For example, the virtual input area is specifically presented as a virtual keyboard, and the virtual input element is a key in the virtual keyboard.

The virtual input element is different from a physical input element. For example, a key in a physical keyboard is a physical input element, and a key in the virtual keyboard is a virtual input element.

In other embodiments, presence of the virtual input element may not depend on the virtual input area. That is, there may be no virtual input area, but there is at least one virtual input element. For example, in a VR scenario, the head mounted device may display, in the virtual space, at least one virtual button that is independent of each other.

Further, in addition to the key in the virtual keyboard, the virtual input element may alternatively be represented in another form. This is not limited herein. For example, at least one interface is displayed in the virtual space of the VR scenario, and the interface includes at least one selection button. The selection button is a virtual input element, that is, the virtual input element is specifically presented as a selection button in the interface.

(2) VR, AR, and MR

VR is a human-machine interaction method created by using computer and sensor technologies. The VR technology integrates a computer graphics technology, a computer simulation technology, a sensor technology, a display technology, and the like, and can create a virtual environment. The virtual environment includes a three-dimensional stereoscopic realistic image generated and dynamically played in real time by a computer, to bring visual perception to a user. In addition, in addition to visual perception generated by a computer graphics technology, there is perception including an auditory sense, a tactile sense, a force sense, and a motion, and even a sense of smell and a sense of taste, which is also referred to as multi-perception. In addition, a head rotation, an eye, a gesture, or another human body behavior action of the user may be further detected, and the computer processes data corresponding to the action of the user, responds to the action of the user in real time, and feeds back the action to five sense organs of the user, to display the virtual environment.

For example, the user may see a VR game interface by wearing a VR wearable device, and may interact with the VR game interface by using an operation through a gesture or a controller, as if the user is in a game.

For another example, the user may browse a web page interface by wearing the VR wearable device, may see a virtual keyboard, and enter corresponding text information by entering a corresponding gesture on the virtual keyboard.

AR is a technology that adds a virtual object generated by a computer to the real world to enhance the real world. That is, in the AR technology, a real-world scenario needs to be collected, and then a virtual environment is added to the real world.

Therefore, a difference between the VR technology and the AR technology lies in that the VR technology creates a complete virtual environment, and all objects seen by the user are virtual objects, while the AR technology superimposes a virtual object in the real world, that is, includes both an object in the real world and the virtual object. For example, the user wears transparent glasses, and can see a real environment around the user by using the glasses, and a virtual object may be further displayed on the glasses. In this way, the user can see both a real object and a virtual object.

MR introduces reality scenario information (or referred to as real scenario information) into a virtual environment, and establishes a bridge between the virtual environment, the real world, and the user for interactive feedback information, thereby enhancing a sense of reality of user experience.

Specifically, a reality object is virtualized (for example, a camera is used to scan the real object for three-dimensional reconstruction to generate a virtual object), and a virtualized real object is introduced into the virtual environment. In this way, the user can see the real object in the virtual environment.

(3) VR System

In some embodiments, the VR system may include a head mounted device and a VR controller, and the head mounted device is an all-in-one VR machine. Generally, the all-in-one VR machine may include a display and a processor, and may be used independently without obtaining image data from an external device.

In some other embodiments, the VR system may alternatively include a host (or a mobile phone, a tablet computer, a cloud, or the like), a head mounted device, and a VR controller. In this case, the head mounted device is specifically a head mounted display device (HMD), and is configured to receive image data from the host, and display the image data.

For example, FIG. 2A is a schematic diagram of a VR system according to an embodiment of this application. As shown in FIG. 2A, the VR system includes a host 21 and a head mounted display device 22. The head mounted display device 22 is connected to the host 21, and a connection manner may be a wired connection or a wireless connection. The VR controller is not shown in the figure.

The host 21 includes a processor, a memory, and the like, and is configured to process data to generate an image. The host 21 may be a PC host. The head mounted display device 22 is configured to receive the image from the host 21, and display the image. In this way, a user can see the image by wearing the head mounted display device 22.

It may be understood that the head mounted display device 22 has a built-in display, and may be specifically VR glasses, a VR helmet, or the like. In this case, the head mounted display device 22 does not have an image generation capability locally, and needs to obtain image data from the host 21.

It should be noted that the host 21 in FIG. 2A may alternatively be replaced with another electronic device. For example, the host 21 may be replaced with a portable electronic device such as a mobile phone or a tablet computer, or may be replaced with a cloud server.

In other words, the head mounted display device 22 may be connected to the host 21 for use, and may further be connected to a device such as a tablet computer, a mobile phone, or a cloud server for use.

In another implementation, the head mounted device has an image display capability and an image generation capability.

The following describes a hardware structure of the head mounted device by using an example. Refer to a schematic block diagram of a hardware structure of an electronic device such as a head mounted device shown in FIG. 2B. A head mounted device 200 may include a processor 210, a memory 220, a sensor module 230 (which may be configured to obtain a posture of a user), a microphone 240, a button 250, an input/output interface 260, a communication module 270, a camera 280, a battery 290, an optical display module 2100, an eye tracking module 2200, and the like.

It can be understood that, the structure shown in this embodiment of this application does not constitute a specific limitation on the head mounted device 200. In some other embodiments of this application, the head mounted device 200 may include more or fewer components than those shown in the figure, or combine some components, or split some components, or have different component arrangements. The components shown in the figure may be implemented by hardware, software, or a combination of software and hardware.

The processor 210 is usually configured to control an overall operation of the head mounted device 200, and may include one or more processing units. For example, the processor 210 may include an application processor (AP), a modem processor, a graphics processing unit (GPU), an image signal processor (ISP), a video processing unit (VPU), a controller, a memory, a video codec, a digital signal processor (DSP), a baseband processor, and/or a neural-network processing unit (NPU). Different processing units may be independent devices, or may be integrated into one or more processors.

A memory may be further disposed in the processor 210, and is configured to store instructions and data.

In some embodiments of this application, the processor 210 may be configured to control focal power of the head mounted device 200. For example, the processor 210 may be configured to control focal power of the optical display module 2100, to implement a function of adjusting the focal power of the head mounted device 200. For example, the processor 210 may adjust relative locations between optical devices (such as a lens) in the optical display module 2100, so that the focal power of the optical display module 2100 is adjusted, and a location of a corresponding virtual image surface may be adjusted when the optical display module 2100 performs imaging on human eyes, thereby achieving an effect of controlling the focal power of the head mounted device 200.

In some embodiments, the processor 210 may include one or more interfaces. The interface may include an inter-integrated circuit (I2C) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) port, a serial peripheral interface (SPI) interface, and the like.

In some embodiments, the processor 210 may perform blurring processing to different degrees on objects in different depths of field, so that the objects in different depths of field have different definition.

The I2C interface is a two-way synchronization serial bus, and includes one serial data line (SDA) and one derail clock line (SCL). In some embodiments, the processor 210 may include a plurality of groups of I2C buses.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 210 and the communication module 270. For example, the processor 210 communicates with a Bluetooth module in the communication module 270 by using the UART interface, to implement a Bluetooth function.

The MIPI interface may be configured to connect the processor 210 to a peripheral component such as a display or the camera 280 in the optical display module 2100.

The GPIO interface may be configured by using software. The GPIO interface may be configured as a control signal or a data signal. In some embodiments, the GPIO interface may be configured to connect the processor 210 to the camera 280, the display in the optical display module 2100, the communication module 270, the sensor module 230, the microphone 240, and the like. The GPIO interface may alternatively be configured as an I2C interface, an I2S interface, a UART interface, an MIPI interface, or the like.

The camera 280 may collect an image including a real object, and the processor 210 may fuse the image collected by the camera with a virtual object, and an image obtained through real fusion is displayed by using the optical display module 2100.

The camera 280 may further collect an image including a human eye. The processor 210 performs eye tracking by using the image.

In this embodiment of this application, the camera 280 may be configured to collect a hand image of the user. The processor 210 is configured to process the hand image of the user, to obtain a hand value representing a size of a hand of the user.

The USB port is a port that conforms to a USB standard specification, and may be specifically a mini USB port, a micro USB port, a USB type-C port, or the like. The USB port may be configured to connect to a charger to charge the head mounted device 200, or may be configured to transmit data between the head mounted device 200 and a peripheral device, or may be configured to connect to a headset to play audio by using the headset. The port may be further configured to be connected to another electronic device, for example, a mobile phone. The USB port may be a USB 3.0, and is configured to be compatible with a high-speed display port (DP) for signal transmission, and may transmit high-speed audio and video data.

It can be understood that, connection relationships between interfaces of various modules shown in this embodiment of this application are merely illustrative descriptions, and do not constitute a limitation on a structure of the head mounted device 200. In some other embodiments of this application, the head mounted device 200 may use interface connection manners different from those in the foregoing embodiment, or use a combination of a plurality of interface connection manners.

In addition, the head mounted device 200 may include a communication module. For example, the head mounted device 200 may receive an image from another electronic device (for example, a host or a mobile phone) for display.

The communication module 270 may include a wireless communication module and a mobile communication module. The wireless communication function may be implemented by using an antenna (not shown), a mobile communication module (not shown), a modem processor (not shown), a baseband processor (not shown), and the like. The antenna is configured to transmit and receive an electromagnetic wave signal.

The mobile communication module may provide a wireless communication solution applied to the head mounted device 200, including a 2nd generation (2G) network, a 3rd generation (3G) network, a 4th generation (4G) network, a 5th generation (5G) network, or the like. The mobile communication module may include at least one filter, a switch, a power amplifier, a low noise amplifier (LNA), and the like. The mobile communication module may receive an electromagnetic wave through the antenna, perform processing such as filtering and amplifying on the received electromagnetic wave, and transfer the received electromagnetic wave to the modem processor for demodulation. The mobile communication module may further amplify a signal modulated by the modem processor, and convert the signal into an electromagnetic wave through the antenna for radiation. In some embodiments, at least some function modules in the mobile communication module may be disposed in the processor 210. In some embodiments, at least some function modules of the mobile communication module may be disposed in a same device as at least some modules of the processor 210.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then the demodulator transfers the low-frequency baseband signal obtained through demodulation to the baseband processor for processing. After being processed by the baseband processor, the low-frequency baseband signal is transmitted to the application processor. The application processor outputs a sound signal by using an audio device (not limited to a speaker or the like), or displays an image or a video by using the display in the optical display module 2100. In some embodiments, the modem processor may be an independent device. In some other embodiments, the modem processor may be independent of the processor 210, and is disposed in a same device as the mobile communication module or another function module.

The wireless communication module may provide a solution that is applied to the head mounted device 200 and includes wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module may be one or more devices integrating at least one communication processing module. The wireless communication module receives an electromagnetic wave through an antenna, performs frequency modulation and filtering processing on the electromagnetic wave signal, and sends the processed signal to the processor 210. The wireless communication module may further receive a to-be-sent signal from the processor 210, perform frequency modulation and amplification on the signal, and convert, through the antenna, the signal into an electromagnetic wave for radiation.

In some embodiments, the antenna of the head mounted device 200 is coupled to the mobile communication module, so that the head mounted device 200 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The head mounted device 200 implements a display function by using the GPU, the optical display module 2100, the application processor, and the like. The GPU is a microprocessor for image processing, and is connected to the optical display module 2100 and the application processor. The GPU is configured to: perform mathematical and geometric computation, and render an image. The processor 210 may include one or more GPUs that execute program instructions to generate or change display information.

The memory 220 may be configured to store computer-executable program code, and the executable program code includes instructions. The processor 210 executes various function applications and data processing of the head mounted device 200 by running the instructions stored in the memory 220. The memory 220 may include a program storage area and a data storage area. The program storage area may store an operating system, an application required by at least one function (for example, a voice playing function or an image playing function), and the like. The data storage area may store data (such as audio data and an address book) and the like created during use of the head mounted device 200. In addition, the memory 220 may include a high-speed random access memory, or may include a non-volatile memory, for example, at least one magnetic disk storage device, a flash storage device, or a universal flash storage (UFS).

The head mounted device 200 may implement an audio function by using an audio module, the speaker, the microphone 240, a headset jack, the application processor, and the like, for example, music playing and recording. The audio module is configured to convert digital audio information into analog audio signal output, and is further configured to convert analog audio input into a digital audio signal. The audio module may be further configured to: code and decode an audio signal. In some embodiments, the audio module may be disposed in the processor 210, or some function modules in the audio module are disposed in the processor 210. The speaker, also referred to as a "loudspeaker", is configured to convert an audio electrical signal into a sound signal. The head mounted device 200 may be used to listen to music or a hands-free call by using the speaker.

The microphone 240, also referred to as a "mike" or a "mic", is configured to convert a sound signal into an electrical signal. At least one microphone 240 may be disposed in the head mounted device 200. In some other embodiments, two microphones 240 may be disposed in the head mounted device 200, to collect a sound signal and implement a noise reduction function. In some other embodiments, three, four, or more microphones 240 may be disposed in the head mounted device 200, to collect a sound signal and implement noise reduction, and further recognize a sound source to implement a directional recording function and the like.

The headset jack is configured to connect to a wired headset. The headset jack may be a USB port, or may be a 3.5 mm open mobile terminal platform (OMTP) standard interface or a cellular telecommunications industry association of the USA (CTIA) standard interface.

In some embodiments, the head mounted device may include one or more buttons 250. These keys may control the head mounted device 200, and provide the user with a function of accessing the head mounted device 200. The buttons 250 may be in a form of a button, a switch, a dial, or a touch or near-touch sensing device (such as a touch sensor). Specifically, for example, the user may enable the optical display module 2100 of the head mounted device 200 by pressing the button. The button 250 includes a power button, a volume button, and the like. The button 250 may be a mechanical button, or may be a touch button. The head mounted device 200 may receive input from the button, and generate button signal input related to user settings and function control of the head mounted device 200.

In some embodiments, the head mounted device 200 may include an input/output interface 260, and the input/output interface 260 may connect another apparatus to the head mounted device 200 by using a suitable component. The components may include, for example, an audio jack, a video jack, and/or a data connector.

The optical display module 2100 is configured to present an image to the user under control of the processor 210. The optical display module 2100 may convert, by using one or more optical devices of a reflection mirror, a transmission mirror, an optical waveguide, or the like, a real pixel image into a near-eye projected virtual image for display, to implement virtual interaction experience or implement interaction experience combining virtual and reality. For example, the optical display module 2100 receives image data information sent by the processor 210, and presents a corresponding image to the user.

In some embodiments, the head mounted device 200 may further include an eye tracking module 2200. The eye tracking module 2200 is configured to track a movement of a human eye, to determine a fixation point of the human eye. For example, by using an image processing technology, a pupil location may be located, and pupil center coordinates may be obtained, to calculate a fixation point of a person.

It should be noted that, for specific hardware structures of the head mounted display device 22 and the host 21 in FIG. 2A, refer to FIG. 2B. For example, the head mounted display device 22 may include a communication module, a camera, a battery, an optical display module, an input/output interface, an eye tracking module, a sensor module, a button, an image processor, and a GPU. The host 21 may include a processor, a memory, a communication module, and the like.

In a VR scenario, when the VR system specifically includes an all-in-one VR machine, the all-in-one VR machine may collect hand data by using a sensor, and process the hand data to obtain a hand value, where the hand value represents a size of a hand; and then after determining a distance between virtual input elements based on the hand value, display a corresponding virtual input element.

When the VR system is specifically the system shown in FIG. 2A, a sensor is integrated into the head mounted display device 22, and is configured to collect hand data of the user. For example, the sensor is an image sensor, and the hand data is hand image data. The host 21 receives the hand data from the head mounted display device 22, processes the hand data to obtain a hand value, renders an image of a virtual input element based on the hand value, and sends the image of the virtual input element to the head mounted display device 22. The head mounted display device 22 displays the received image of the virtual input element. The hand may be two hands, or may be one of the two hands.

It should be noted that the VR system shown above may alternatively be an MR system or an AR system. For similarities among AR, MR, and VR, refer to the foregoing related content about VR. Details are not described herein again.

After related content that may be used in embodiments of this application is described, the following describes, by using an example, a scenario that may be used in embodiments of this application.

1. VR Scenario and Virtual Keyboard

Figure 3:
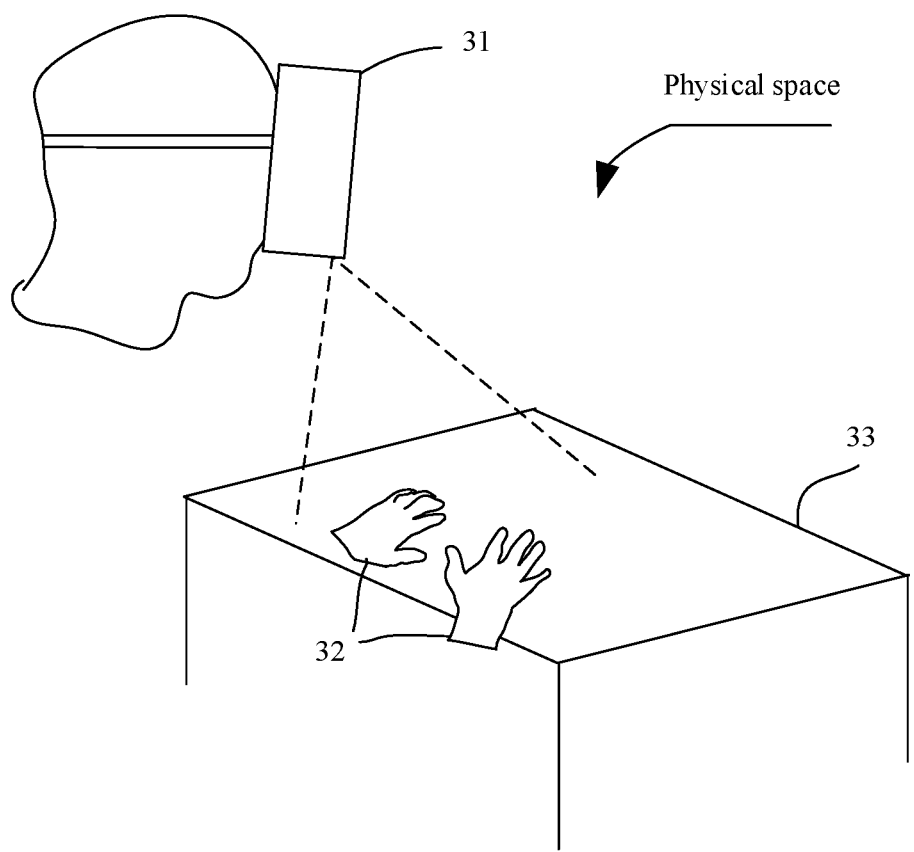
FIG. 3 is a schematic diagram of a VR scenario according to an embodiment of this application.

FIG. 3 is a schematic diagram of a VR scenario according to an embodiment of this application. As shown in FIG. 3, in physical space, the scenario may include a head mounted device 31, a hand 32 of a user, and a physical surface 33 (for example, a desktop, where the physical surface may be a physical plane, and the plane is more convenient for typing).

The head mounted device 31 may be an all-in-one VR machine, or may be externally connected to another electronic device, for example, a host or a mobile phone. In this case, it is assumed that the head mounted device 31 is an all-in-one VR machine, and a binocular camera is integrated into the device.

The binocular camera includes two cameras, and the two cameras may be placed horizontally on left and right sides, to simulate two human eyes. Depth information is obtained by using images separately photographed by the two cameras.

As shown in FIG. 3, after the user wears the head mounted device 31 and enables a gesture input function, when the hand 32 of the user is located in a detection range of the binocular camera, the head mounted device 31 displays, in virtual space, a virtual keyboard matching the hand 32 of the user.

When the user places the hand 32 on the physical surface 33, or in a process in which the user places the hand 32 on the physical surface 33, the head mounted device 31 displays the virtual keyboard that adapts to the hand 32.

The virtual keyboard matching the hand 32 means that a size of the virtual keyboard matches a size of the hand 32. That is, virtual keyboards of different sizes are displayed based on the size of the hand 32.

The size of the hand is positively correlated with a dimension of the virtual keyboard. When the hand 32 is of a first size, the head mounted device 31 displays a virtual keyboard of a first dimension; and when the hand 32 is of a second size, the head mounted device 31 displays a virtual keyboard of a second dimension. The first size is different from the second size, and the first dimension is different from the second dimension.

In a specific application, a hand value may be used to describe the size of the hand. The hand value may include but is not limited to a palm size, a finger length, and the like. The hand value varies with the size of the hand.

A value of a hand of the first size is a first hand value, and a value of a hand of the second size is a second hand value. Based on this, when a value of the hand 32 is the first hand value, the virtual keyboard of the first dimension is displayed; and when the value of the hand 32 is the second hand value, the virtual keyboard of the second dimension is displayed. The first hand value is different from the second hand value.

When the size of the hand corresponding to the first hand value is greater than the size of the hand corresponding to the second hand value, the first dimension is greater than the second dimension. That is, a larger hand 32 indicates a larger dimension of the virtual keyboard.

Figure 4A:
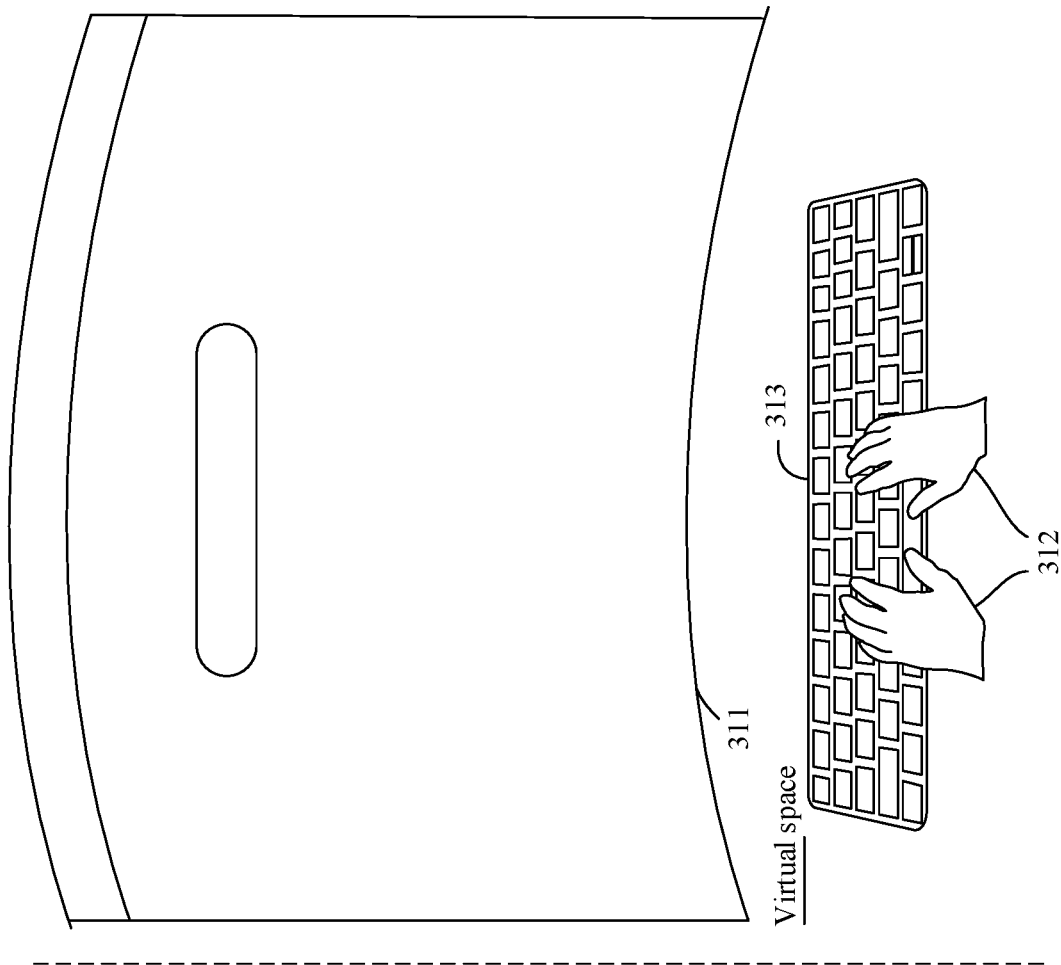
FIG. 4A and FIG. 4B are schematic diagrams of virtual space in a VR scenario according to an embodiment of this application.
Figure 4A:
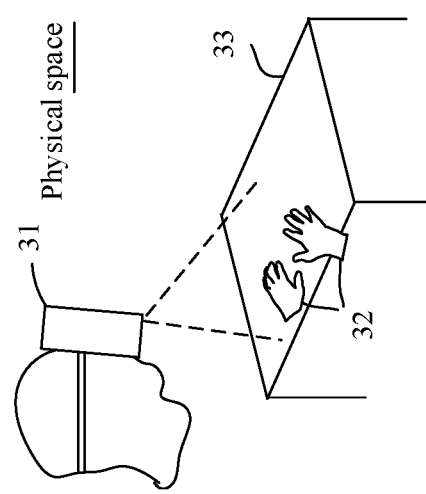
Figure 4B:
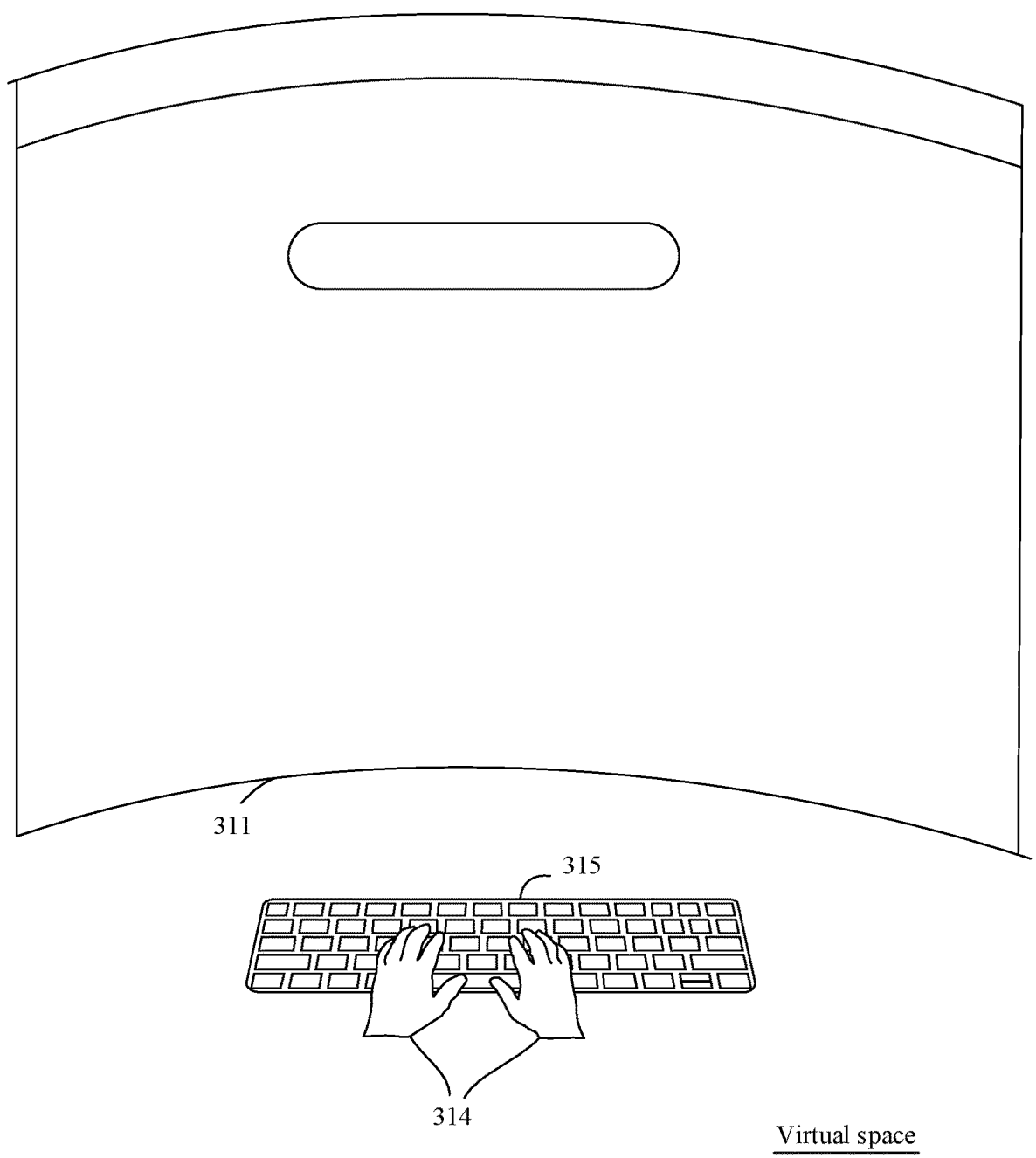

For example, refer to schematic diagrams of virtual space in a VR scenario shown in FIG. 4A and FIG. 4B. Based on the scenario in FIG. 3, in FIG. 4A, the virtual space of the head mounted device 31 includes an interface 311, a virtual hand 312, and a virtual keyboard 313.

The virtual hand 312 is a hand model corresponding to the hand 32 in FIG. 3, and the virtual hand 312 is a hand model rendered by the head mounted device 31 based on a hand image collected by the binocular camera. A size of the hand model corresponds to the size of the hand 32. In this case, the size of the hand 32 is the first size, and the virtual keyboard 313 is the virtual keyboard of the first dimension.

Similar to FIG. 4A, in FIG. 4B, the virtual space of the head mounted device 31 includes the interface 311, a virtual hand 314 corresponding to the hand 32, and a virtual keyboard 315. In this case, the size of the hand 32 is the second size, and the virtual keyboard 315 is the virtual keyboard of the second dimension. A size of the virtual hand 314 corresponds to the size of the hand 32.

It can be learned by comparing FIG. 4A and FIG. 4B that the size of the virtual hand 312 is greater than the size of the virtual hand 314, and a dimension of the virtual keyboard 313 is greater than a dimension of the virtual keyboard 315. That is, the hand 32 in the scenario in FIG. 4A is greater than the hand 32 in the scenario in FIG. 4B. For example, in FIG. 4A, the hand 32 is a hand of an adult, and in FIG. 4B, the hand 32 is a hand of a child, where the hand of the adult is greater than the hand of the child.

By changing the dimension of the virtual keyboard, a distance between center points of adjacent keys in the virtual keyboard is changed. A larger hand 32 indicates a larger dimension of the virtual keyboard displayed by the head mounted device, a larger key distance (namely, the distance between the center points of the adjacent keys) in the virtual keyboard, a lower probability of blocking fingers, and higher recognition accuracy of an input gesture.

It may be understood that the head mounted device 31 may further display the detected physical surface 33 in the virtual space.

The head mounted device 31 renders a corresponding virtual hand in the virtual space in real time by using the obtained hand image, physical spatial location information of the hand 32, and the like. The rendered virtual hand and the virtual keyboard are on a same plane.

Figure 5:
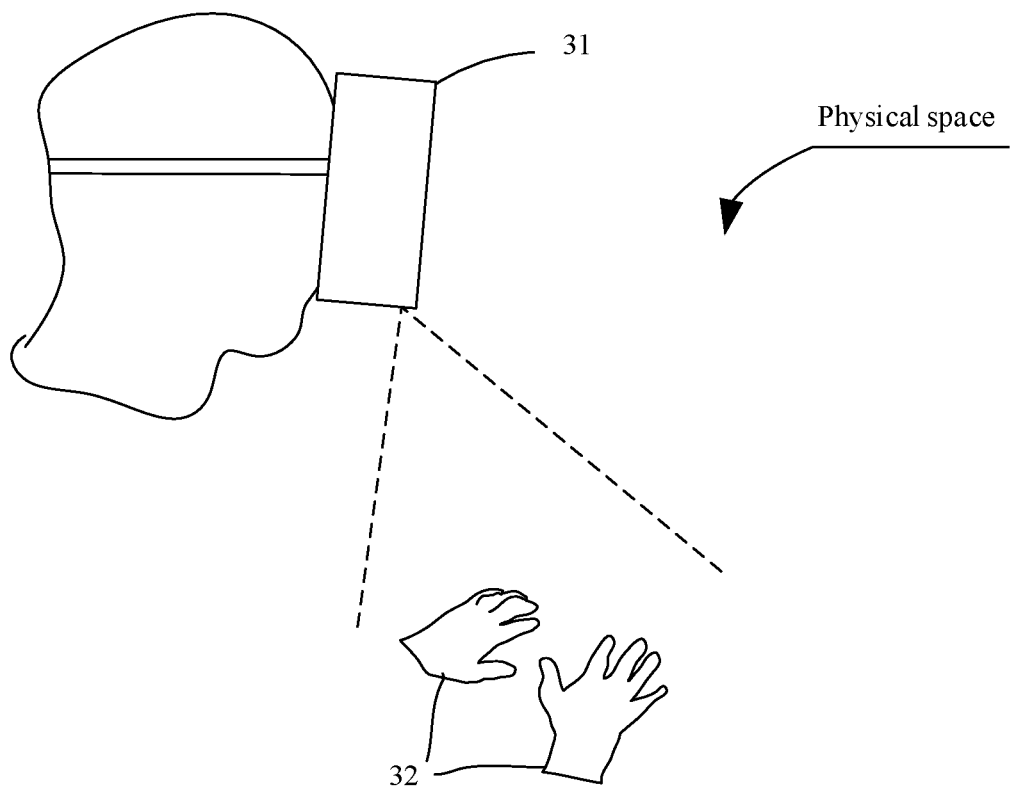
FIG. 5 is a schematic diagram of another VR scenario according to an embodiment of this application.

In FIG. 3, the user performs gesture input on the physical surface 33. In another embodiment, the user may alternatively perform gesture input in a suspended manner without depending on the physical surface 33. For example, refer to a schematic diagram of another VR scenario shown in FIG. 5. When the hand 32 of the user is located in the detection range of the binocular camera of the head mounted device 31, the head mounted device 31 displays a virtual keyboard corresponding to the hand 32.

The following are supplements to the preceding scenarios.
(1) A Manner in which the Head Mounted Device 31 Enables the Gesture Input Function The gesture input function of the head mounted device 31 may be manually enabled by the user, or may be automatically enabled by the head mounted device 31 after a preset enabling condition is met.

For example, the user may alternatively manually enable the gesture input function by using a menu or a button. For example, the head mounted device 31 displays a start button in the virtual space, and when detecting a tap operation performed by the user on the start button, the head mounted device 31 enables the gesture input function in response to the tap operation.

For example, the preset enabling condition may include the following conditions: A VR controller (not shown in the figure) is in a static state; and a distance between the hand and a target physical surface is less than a first distance threshold. The target physical surface is a physical surface closest to the binocular camera of the head mounted device 31.

In other words, when the VR controller is in the static state, and the distance between the hand and the target physical surface is less than the first distance threshold, it is considered that the preset enabling condition is met, and the gesture input function is automatically enabled. On the contrary, when the VR controller is in a non-static state, and/or the distance between the hand and the target physical surface is greater than or equal to the first distance threshold, it is considered that the preset enabling condition is not met, and the gesture input function is not enabled.

The head mounted device 31 may determine, by using sensor data of the VR controller, whether the VR controller is in the static state.

For example, the head mounted device 31 obtains data of an inertia measurement unit (IMU) of the VR controller, or six degrees of freedom (dof) locations of the VR controller. When a variation of the IMU data or the dof data is small, it may be determined that the VR controller is in the static state. Otherwise, it is determined that the VR controller is in the non-static state.

The head mounted device 31 may detect a surrounding physical quantity plane by using a plane detection function of simultaneous localization and mapping (slam), and determine the physical surface closest to the binocular camera as the target physical surface. In this case, the target physical surface is the physical surface 33 in FIG. 3.

The plane detection function of the slam is used to detect a plane in the physical space. In this embodiment of this application, the head mounted device 31 collects an environmental image of a surrounding environment by using the binocular camera, obtains depth information of the surrounding environment based on an image photographed by each camera in the binocular camera, obtains, based on the depth information, image feature points that belong to a same plane, and forms a plane based on these image feature points.

When the camera on the head mounted device 31 is a monocular camera, after the user wears the head mounted device 31, depth information of the surrounding environment is obtained by using motion and the monocular camera, image feature points that belong to a same plane are obtained based on the depth information, and then a plane is formed based on these feature points.

Certainly, in addition to obtaining depth information through vision, the head mounted device may obtain depth information of the hand in another manner, for example, may obtain the depth information of the hand by using a millimeter-wave radar.

Generally, the slam obtains point cloud data of a surrounding environment based on a lidar, determines, in the point cloud data, points that belong to a same plane, and determines an area formed by these points as a plane. In this embodiment of this application, the point cloud data is replaced with the image feature point.

The head mounted device 31 may detect a distance between the hand 32 and the physical surface 33 in real time, and compare the distance and the first distance threshold.

Based on this, when the VR controller is in the static state, in a process in which the hand 32 of the user gradually approaches the physical surface 33, when the distance between the hand 32 and the physical surface 33 is less than the first distance threshold, the head mounted device 31 automatically enables the gesture input function. After the gesture input function is automatically enabled, because the hand 32 is located in the detection range of the binocular camera in this case, the head mounted device 31 displays, in the virtual space, the virtual keyboard corresponding to the hand 32.

When displaying the virtual keyboard in the virtual space, the head mounted device 31 may display the virtual keyboard at any location in the virtual space. In some embodiments, the virtual keyboard may be displayed right below the hand 32 or at a location to which the hand is about to fall. In this way, the user does not need to change the location of the virtual keyboard through operations such as dragging, thereby improving user experience. It may be understood that the head mounted device 31 may establish a hand model of the hand 32 in real time, and display the hand model in the virtual space. The virtual keyboard is displayed right below the hand model corresponding to the hand 32.

Certainly, in another implementation, the preset enabling condition may include: The target physical surface is detected; and it is detected that a distance between two hands and the target physical surface is less than the first distance threshold. In this case, the head mounted device 31 may not need to determine whether the VR controller is in the static state, and when the distance between the hand 32 and the physical surface 33 is less than the first distance threshold, it is determined that the preset enabling condition is met, and the gesture input function is automatically enabled. The preset enabling condition is not limited in this embodiment of this application.

(2) A Manner in which the Head Mounted Device 31 Disables the Gesture Input Function In some embodiments, the head mounted device 31 may automatically disable the gesture input function. When a preset disabling condition is met, the head mounted device 31 automatically disables the gesture input function. After the gesture input function is automatically disabled, the head mounted device 31 removes the displayed virtual keyboard from the virtual space.

For example, the preset disabling condition may include the following condition: It is detected that the distance between the hand 32 and the target physical surface (namely, the physical surface 33) is greater than a second distance threshold.

That is, when detecting that the distance between the hand 32 and the physical surface 33 is greater than the second distance threshold, the head mounted device 31 automatically disables the gesture input function, and removes the displayed virtual keyboard. Certainly, the preset disabling condition is not limited to the examples mentioned above.

The first distance threshold and the second distance threshold may be equal or may not be equal. A specific value may be set based on an actual requirement. This is not limited herein.

In this case, in the scenario shown in FIG. 3, in the process in which the user places the hand 32 on the physical surface 33, when the distance between the hand 32 and the physical surface 33 is less than the first distance threshold, it is considered that the hand 32 approaches the physical surface 33, and the head mounted device 31 automatically enables the gesture input function, and displays the virtual keyboard in the virtual space. When the distance between the hand 32 and the physical surface 33 is greater than the second distance threshold, it is considered that the hand 32 is away from the physical surface 33, and the head mounted device 31 automatically disables the gesture input function, and removes the displayed virtual keyboard from the virtual space.

It may be understood that, after the hand 32 of the user leaves the physical surface 33, the head mounted device 31 detects again that the hand 32 approaches the physical surface 33, and the distance between the hand 32 and the physical surface 33 is less than the first distance threshold. If it is detected that the controller is in the static state in this case, the head mounted device 31 displays the virtual keyboard in the virtual space again.

In some other embodiments, the user may alternatively manually disable the gesture input function. In this case, the user may disable the gesture input function by using a menu, a button, or the like.

In comparison, the head mounted device 31 automatically enables and disables the gesture input function, and the user does not need to enable and disable the gesture input function by using a complex operation. Therefore, user experience is high, and input efficiency is further improved.

It may be understood that the gesture input function of the head mounted device 31 may alternatively be always in an enabled state.

2. VR Game Scenario

Figure 6:
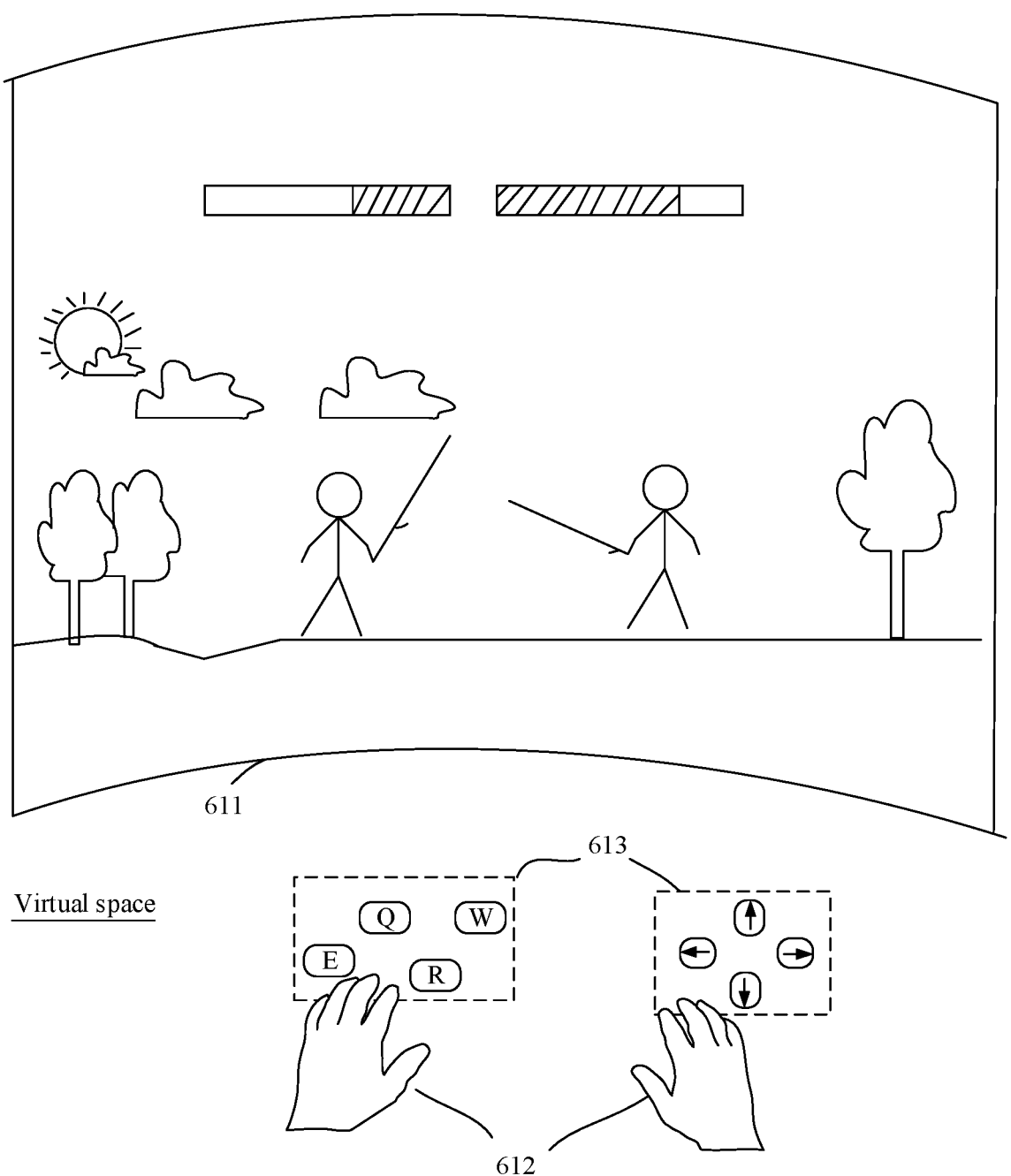
FIG. 6 is a schematic diagram of a VR game scenario according to an embodiment of this application.

FIG. 6 is a schematic diagram of a VR game scenario according to an embodiment of this application. As shown in FIG. 6, virtual space of a head mounted device includes a game interface 611, a virtual hand 612, and a virtual input element 613. A user may operate a game role in the game interface 611 based on the virtual input element 613, for example, control, by using a direction button in the virtual input element 613, the game role to move up, down, left, and right.

It may be understood that, after the head mounted device enables a gesture input function, when a hand of the user is located in a detection range of a camera of the head mounted device, the head mounted device displays, in the virtual space, the virtual input element 613 corresponding to a size of the hand of the user. The virtual hand 612 is a hand model established based on the physical hand of the user.

A distance between center points of adjacent input elements in the virtual input element 613 is positively correlated with the size of the hand of the user. A larger hand of the user indicates a larger distance between center points of adjacent input elements, so as to reduce a probability of blocking fingers, and improve recognition accuracy of an input gesture.

When the hand of the user is of a first size, the distance between the center points of the adjacent virtual input elements is a first distance. When the hand of the user is of a second size, the distance between the center points of the adjacent virtual input elements is a second distance. The first size is different from the second size, and the first distance is different from the second distance.

3. Another Scenario

Figure 7:
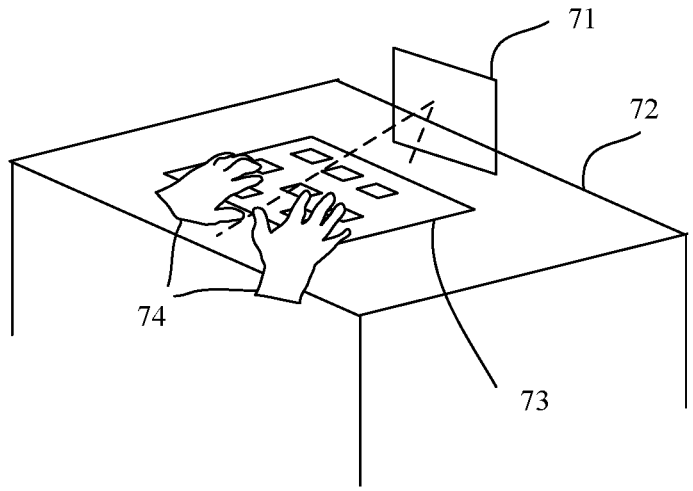
FIG. 7 is a schematic diagram of a virtual keyboard projection scenario according to an embodiment of this application.

FIG. 7 is a schematic diagram of a virtual keyboard projection scenario according to an embodiment of this application. A keyboard projection device 71 projects a virtual keyboard 73 onto a physical surface 72. The keyboard projection device 71 may project the virtual keyboard 73 by using a camera or a laser.

When a hand 74 of a user is located in a detection range of the camera, the keyboard projection device 71 projects the virtual keyboard 73 onto the physical surface 72. The keyboard projection device 71 projects a virtual keyboard 73 of a corresponding dimension based on a size of a hand of a user.

When the hand 74 is of a first size, the dimension of the virtual keyboard 73 is a first dimension; and when the hand 74 is of a second size, the dimension of the virtual keyboard 73 is the second dimension.

A distance between center points of adjacent keys in the virtual keyboard 73 varies with the dimension of the virtual keyboard 73. By changing the dimension of the virtual keyboard 73, the distance between the center points of the adjacent keys in the virtual keyboard 73 is changed.

It should be noted that the scenarios mentioned above are merely examples, and do not constitute a limitation on an application scenario of this embodiment of this application. For example, the VR scenario is used as an example. This embodiment of this application may be further applied to a VR education scenario and the like. The solutions provided in this embodiment of this application may be applied to any scenario involving a virtual input element.

After the possible scenarios in this embodiment of this application are described by using examples, the following describes in detail the technical solutions provided in this embodiment of this application with reference to the examples and the accompanying drawings.

Figure 8:
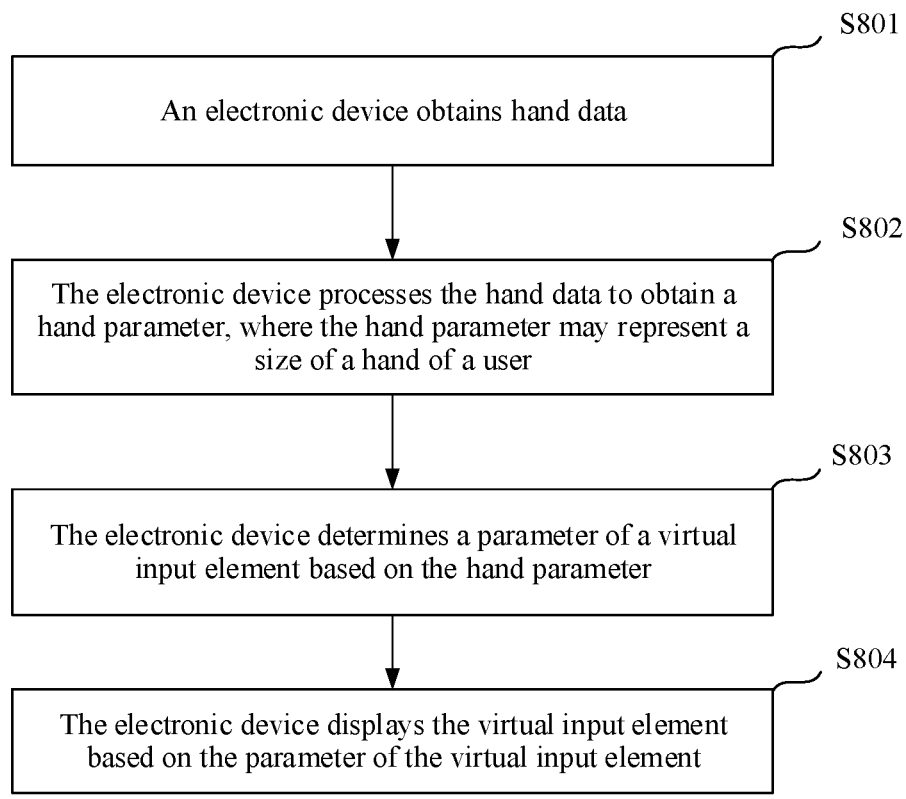
FIG. 8 is a schematic block flowchart of a virtual input element display method according to an embodiment of this application.

FIG. 8 is a schematic block flowchart of a virtual input element display method according to an embodiment of this application. The method may include the following steps.

Step S801: An electronic device obtains hand data.

The hand data is data collected by using a sensor. For example, the sensor is an image sensor, and the hand data is hand image data. In this case, the electronic device may collect a hand image of a user by using a camera. Further, the hand image may be a depth map, and the depth map may be collected by using a binocular camera, or may be collected by using a monocular camera and an IMU unit.

A VR scenario is used as an example. When the electronic device is an all-in-one VR machine, a camera may be integrated into the all-in-one VR machine, and a hand image is photographed by using the camera. For example, the camera may be a binocular camera, and the binocular camera includes two cameras. Hand depth information may be obtained based on hand images photographed by using the two cameras.

When a VR device is the VR system shown in FIG. 2A, the electronic device is a host, a mobile phone, a tablet computer, a cloud server, or the like. In this case, the electronic device receives the hand image sent by a head mounted display device, to obtain the hand data. A binocular camera is integrated into the head mounted display device. After photographing the hand image by using the binocular camera, the head mounted display device sends the hand image to the electronic device, for example, a host, a mobile phone, or a tablet computer.

For example, refer to FIG. 3. After wearing the head mounted device 31, the user places the hand 32 on the physical surface 33. In a process in which the hand 32 is placed on the physical surface 33, the head mounted device 31 photographs a hand image of the hand 32 by using the built-in binocular camera from a top-down angle. A hand depth map is obtained based on an image photographed by each camera in the binocular camera.

Step S802: The electronic device processes the hand data to obtain a hand parameter. The hand parameter may represent a size of the hand of the user In some embodiments, the hand data is a hand image. In this case, the electronic device processes the hand image, to detect a key point of the hand of the user, or detect side lengths of the four sides of a palm, so as to obtain the hand parameter.

Figure 9:
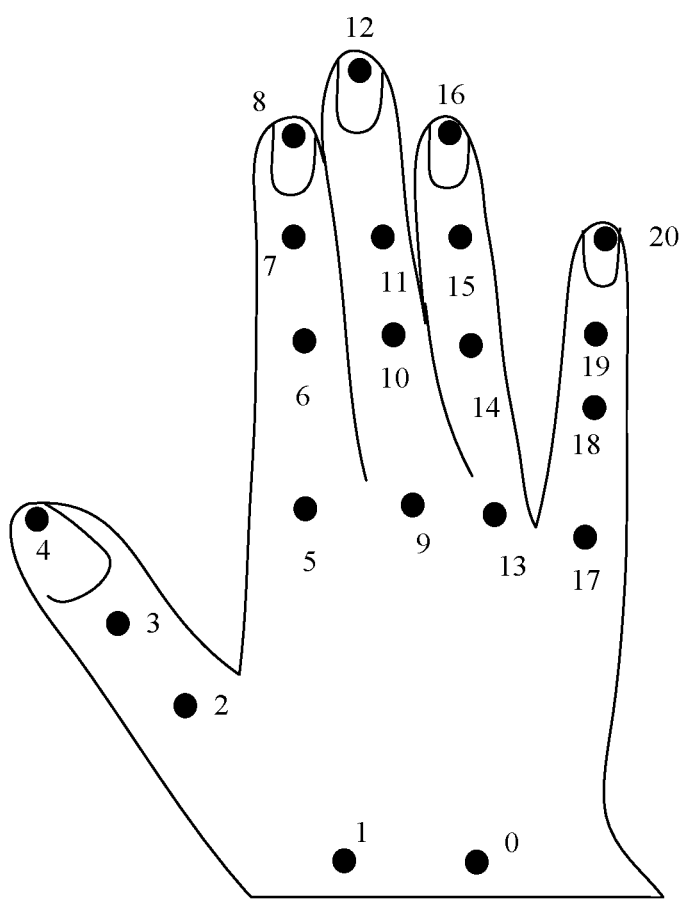
FIG. 9 is a schematic diagram of a hand articulation point according to an embodiment of this application.

For example, refer to a schematic diagram of a hand articulation point shown in FIG. 9. The hand includes 21 key points, which are a key point 0 to a key point 20 shown in FIG. 9. In FIG. 9, a black dot represents a key point on the hand, and a number next to the black dot represents a sequence number.

The following information may be obtained by processing the hand image data: a type of the hand and locations of the 21 key points of the hand.

The type of the hand represents whether the hand is a left hand or a right hand.

A data format of the locations of the 21 key points of the hand may be [x0, y0, z0, x1, y1, z1, . . . ], and a spatial location of each key point is represented by [x, y, z].

The hand parameter may be calculated based on the spatial location of each key point on the hand. For example, the hand parameter may include a size of the palm and a length of each finger.

As shown in FIG. 9, the key point 0, the key point 1, the key point 2, the key point 5, the key point 9, the key point 13, and the key point 17 are connected, and then the size of the palm is calculated based on spatial locations of these key points.

A length of a thumb is calculated based on spatial locations of the key point 2, the key point 3, and the key point 4, and a length of an index finger is calculated based on spatial locations of the key point 5, the key point 6, the key point 7, and the key point 8.

Similarly, a length of a middle finger is calculated based on the key point 9, the key point 10, the key point 11, and the key point 12. A length of a ring finger is calculated based on the key point 13, the key point 14, the key point 15, and the key point 16. A length of a tail finger is calculated based on the key point 17, the key point 18, the key point 19, and the key point 20.

Step S803: The electronic device determines a parameter of a virtual input element based on the hand parameter. The parameter of the virtual input element is used to describe a distance between center points of adjacent virtual input elements.

Figure 10A:
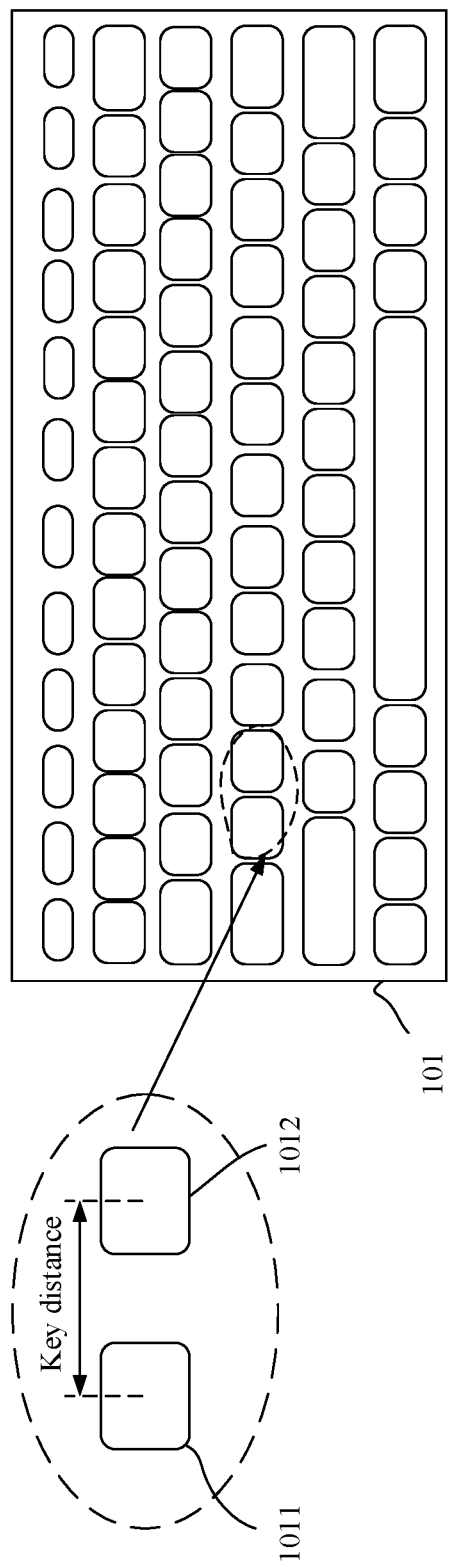
FIG. 10A is a schematic diagram of a key distance according to an embodiment of this application.

For example, refer to a schematic diagram of a key distance shown in FIG. 10A. A virtual keyboard 101 includes a key 1011 and a key 1012. A distance between a center point of the key 1011 and a center point of the key 1012 is the key distance. In this case, the virtual input element is specifically a key in the virtual keyboard 101, and the distance between the virtual input elements is a distance between center points of adjacent keys. In addition to a distance in a horizontal direction, the distance between virtual input elements further includes a distance in a vertical direction. FIG. 10A shows only a distance between the key 1011 and the key 1012 in the horizontal direction.

It should be noted that there is a correspondence between the hand parameter and the parameter of the virtual input element. According to the correspondence, a corresponding parameter of the virtual input element may be found based on the hand parameter. In some embodiments, the parameter of the virtual input element includes the distance between the center points of the adjacent virtual input elements and an area size of a single virtual input element.

Figure 10B:
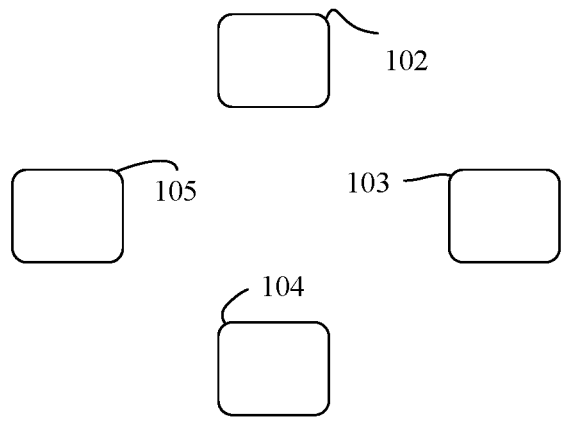
FIG. 10B is a schematic diagram of a virtual input element according to an embodiment of this application.

For example, refer to a schematic diagram of a virtual input element shown in 10B. In a scenario, a virtual input element 102, a virtual input element 103, a virtual input element 104, and a virtual input element 105 are included. For example, in the VR game scenario shown in FIG. 6, the four virtual input elements in FIG. 10B are separately configured to control movement of a game role in four directions: up, down, left, and right. In this case, the parameter of the virtual input element includes an area of each virtual input element in FIG. 10B and a distance between the virtual input elements. When the hand parameter of the user is a first hand value, the parameter of the virtual input element includes a first distance and a first area. When the hand parameter of the user is a second hand value, the parameter of the virtual input element includes a second distance and a second area. Each of the first distance and the second distance is the distance between the center points of the adjacent virtual input elements, and each of the first area and the second area is an area of each virtual input element.

It should be noted that the parameter of the virtual input element may include only the distance between the center points of the adjacent virtual input elements. In this case, based on the size of the hand, only the distance between the center points of the adjacent virtual input elements is changed, and the area of a single virtual input element is not changed, that is, the area of the single virtual input element is unchanged.

Alternatively, the parameter of the virtual input element may include only the area of a single virtual input element. That is, the distance between the center points of the adjacent virtual input elements is changed by changing the area of a single virtual input element. For example, the distance between the center points of the adjacent virtual input elements is decreased by increasing the area of a single virtual input element, and the distance between the center points of the adjacent virtual input elements is increased by decreasing the area of a single virtual input element.

Different hand parameters correspond to different parameters of the virtual input element. The correspondence between the hand parameter and the parameter of the virtual input element may be preset, that is, parameters of virtual input elements that correspond to different hand parameters are preset.

For example, hand models of different sizes are generated in advance based on different sizes of the palm, different finger lengths, and the like. Then, a distance parameter and/or an area parameter that are/is most suitable for each hand model are determined through practice verification. The distance parameter represents the distance between the center points of the adjacent virtual input elements, and the area parameter represents the area of a single virtual input element. Finally, a mapping relationship between the hand parameter and the parameter of the virtual input element, or a mapping relationship between the hand model and the parameter of the virtual input element, is established based on the hand parameter of each hand model and the distance parameter, the area parameter, and the like that are most suitable for each hand model.

It should be noted that, when the distance parameter and/or the area parameter corresponding to each hand model are/is determined, the parameter of the virtual input element needs to adapt to the hand parameter, and the distance between the center points of the adjacent virtual input elements needs to be large. In this way, when the user uses the virtual input element to perform gesture input, because the distance between the center points of the adjacent virtual input elements is large, an interval between fingers of the user during gesture input is also large. If the interval between the fingers is large, there is a low probability that the fingers block each other.

Based on the mapping relationship between the hand parameter and the parameter of the virtual input element, after processing the hand data to obtain a current hand parameter, the electronic device may find, from a hand model database, a hand model matching the current hand parameter, and then use a distance parameter and an area parameter that correspond to the matched hand model as a parameter between virtual input elements of the current hand parameter.

In some other embodiments, the foregoing correspondence is specifically a mapping relationship between the hand parameter and a parameter in a virtual input area.

The parameter of the virtual input area may include a parameter representing a virtual input element, for example, a distance between center points of adjacent virtual input elements and an area of a single virtual input element.

The virtual input area includes a plurality of virtual input elements. After the parameter of the virtual input area is determined, a parameter of each virtual input element in the virtual input area is also determined.

For example, the virtual input area is a virtual keyboard, and the virtual input element is a key in the virtual keyboard. In this case, the foregoing mapping relationship is a mapping relationship between the hand parameter and a virtual keyboard parameter.

First, dimensions of virtual keyboards corresponding to different sizes of the hand are preset, to obtain the mapping relationship between the hand parameter and the virtual keyboard parameter.

For example, different hand models are generated in advance based on the hand parameter such as a size of a palm and a finger length. Then, a virtual keyboard parameter that is most suitable for each hand model is determined through practice verification. The virtual keyboard parameter includes a keyboard dimension, an area of a single key, and a distance between center points of adjacent keys. Finally, the mapping relationship between the hand parameter and the virtual keyboard parameter is established based on the hand parameter of each hand model and the virtual keyboard parameter most suitable for each hand model.

It should be noted that, when the virtual keyboard parameter that is most suitable for each hand model is determined, a distance between keys in each virtual keyboard adapts to the size of the hand, and the distance between the center points of the adjacent keys is large. The distance between the center points of the adjacent keys is large. In this way, when the user uses the virtual keyboard to perform gesture input, because the distance between the keys is large, an interval between fingers of the user during gesture input is also large. If the interval between the fingers is large, there is a low probability that the fingers block each other.

Key distances corresponding to different hand models are determined in advance by using an empirical value, so as to adjust, by using the distance between the keys, the interval between the fingers of the user during gesture input, and make the interval between the fingers of the user as large as possible, so as to reduce a probability that the fingers block each other as much as possible.

Then, after obtaining the hand parameter based on the hand data, the electronic device performs matching on the hand model in the database based on the current hand parameter (for example, a current size of the palm and a current finger length), to find a hand model matching the current hand parameter.

After the hand model matching the current hand parameter is found in the database, a virtual keyboard parameter corresponding to the hand model is used as a virtual keyboard parameter corresponding to the current hand parameter.

The virtual keyboard parameter includes a keyboard size, an area of a single key, and a distance between keys. The keyboard size represents an overall dimension of the virtual keyboard, the area of a single key represents a size of a single key in the virtual keyboard, and the distance between the keys represents a distance between adjacent keys in the virtual keyboard.

It may be understood that the overall dimension of the virtual input area is related to the distance between the center points of the adjacent virtual input elements. When the overall dimension of the virtual input area changes, the distance between the center points of the adjacent virtual input elements also changes accordingly. Generally, a larger overall dimension of the virtual input area indicates a larger distance between the center points of the adjacent virtual input elements. On the contrary, a smaller overall dimension of the virtual input area indicates a smaller distance between the center points of the adjacent virtual input elements.

In some cases, when the overall dimension of the virtual input area changes, the size of the virtual input element in the virtual input area may not be unchanged, and a distance between the virtual input elements is changed. Certainly, in some other cases, when the overall dimension of the virtual input area changes, the size of the virtual input element and the distance between the virtual input elements may also change.

Figure 11:
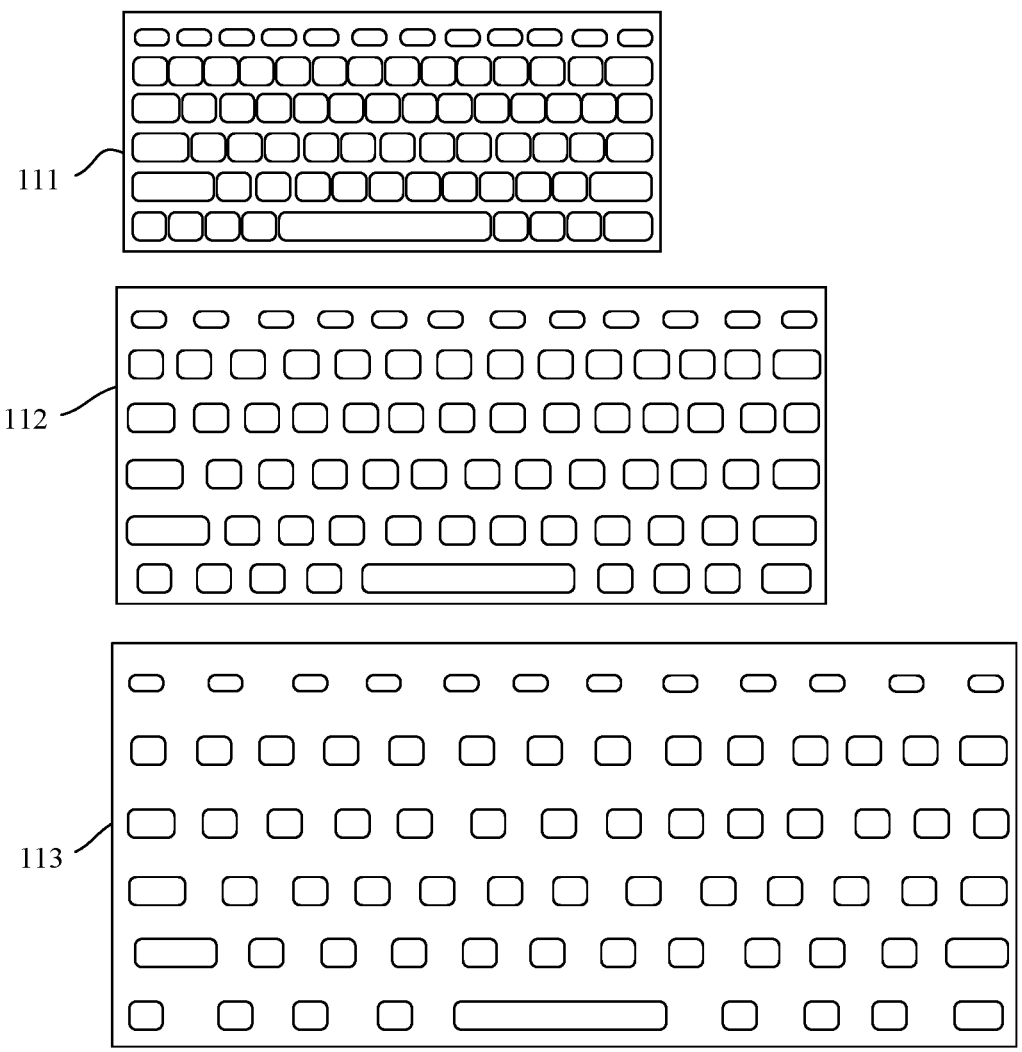
FIG. 11 is a schematic diagram of virtual keyboards of different dimensions according to an embodiment of this application.

For example, refer to a schematic diagram of virtual keyboards of different dimensions shown in FIG. 11. Dimensions of a virtual keyboard 111, a virtual keyboard 112, and a virtual keyboard 113 are all different, the dimension of the virtual keyboard 113 is greater than the dimension of the virtual keyboard 112, and the dimension of the virtual keyboard 112 is greater than the dimension of the virtual keyboard 111. Sizes of keys in the virtual keyboards of different dimensions are the same.

Through comparison, it can be known that a distance between keys in the virtual keyboard 113 is greater than a distance between keys in the virtual keyboard 112, and a distance between keys in the virtual keyboard 112 is greater than a distance between keys in the virtual keyboard 111.

In FIG. 11, when the overall dimension of the virtual keyboard changes, the size of the key does not change. In this way, when the overall dimension of the virtual keyboard changes, the distance between keys in the virtual keyboard also changes accordingly.

The virtual keyboard 111, the virtual keyboard 112, and the virtual keyboard 113 each correspond to a hand model, and parameters such as a size of a palm and a finger length of each hand model are different parameters.

When the size of the hand of the user is large, a virtual keyboard that adapts to the size of the hand and has a large overall dimension is selected. The virtual keyboard with a large overall dimension has a large distance between keys. In this way, when the user uses the virtual keyboard to perform gesture input, because the distance between the keys is large, an interval between fingers of the user during gesture input is also large. If the interval between the fingers is large, when the user uses the virtual keyboard to perform gesture input, there is a low probability that the fingers block each other.

Certainly, when the overall dimension of the virtual input area changes, the size of the virtual input element may change properly. For example, refer to FIG. 12A. An overall dimension of a virtual keyboard 122 is greater than that of a virtual keyboard 121. Compared with the virtual keyboard 121, the virtual keyboard 122 has a larger overall dimension and a larger key in the virtual keyboard.

Figure 12A:
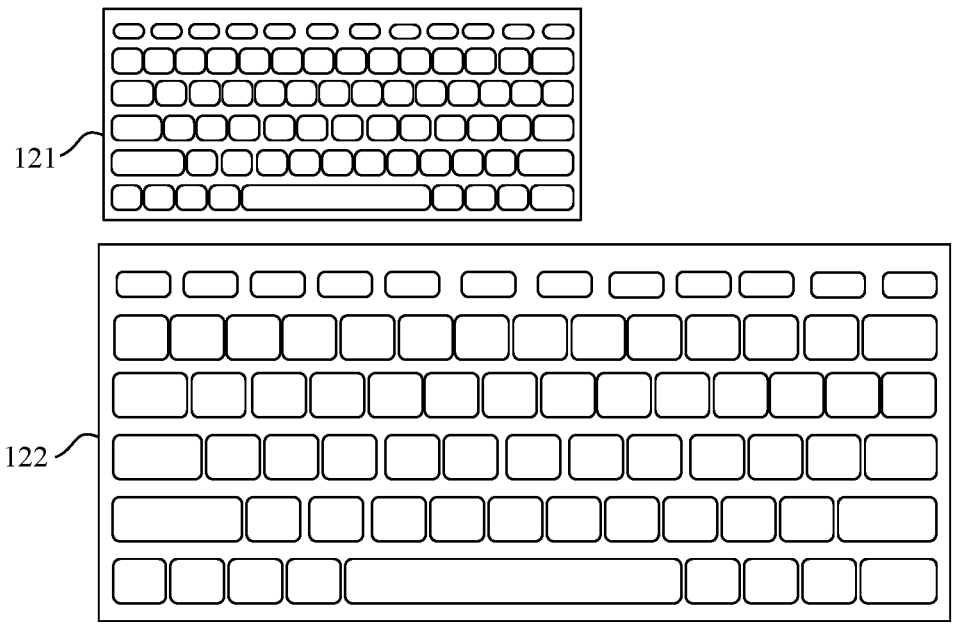
FIG. 12A is a schematic diagram of virtual keyboards of different dimensions according to an embodiment of this application.

In specific application, when the dimension of the virtual keyboard is increased or decreased, the size of the key may be increased or decreased proportionally. As shown in FIG. 12A, the virtual keyboard 122 may be considered as being obtained by enlarging the virtual keyboard 121 for a specific number of times. A first ratio is equal to a second ratio. The first ratio is a ratio of the overall dimension of the virtual keyboard 121 to the overall dimension of the virtual keyboard 122, and the second ratio is a ratio of a key distance in the virtual keyboard 121 to a key distance in the virtual keyboard 122.

Certainly, when the dimension of the virtual keyboard is increased or decreased, the size of the key may not be increased or decreased proportionally, but the size of the key is appropriately changed based on the increased or decreased dimension of the virtual keyboard.

As shown above, the distance between the virtual input elements may be changed by changing the overall dimension of the virtual input area. In another implementation, the overall dimension of the virtual input area remains unchanged, and the distance between virtual input elements may still be changed.

For example, the overall dimension of the virtual keyboard is unchanged, and the distance between the keys in the virtual keyboard is changed by changing an area of each key in the virtual keyboard.

Figure 12B:
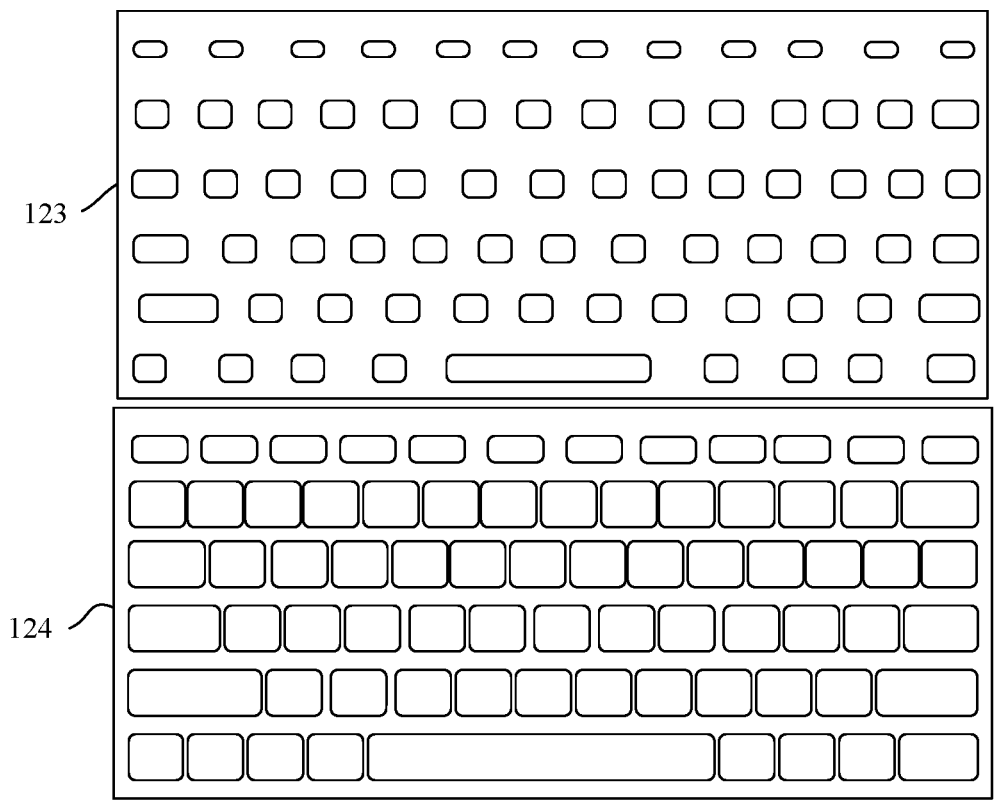
FIG. 12B is a schematic diagram of virtual keyboards of a same dimension according to an embodiment of this application.

For example, FIG. 12B is a schematic diagram of virtual keyboards of a same dimension. A virtual keyboard 123 and a virtual keyboard 124 have a same overall dimension, but an area of a single key in the virtual keyboard 123 is different from an area of a single key in the virtual keyboard 124. Through comparison, it can be known that the area of a single key in the virtual keyboard 123 is smaller than the area of a single key in the virtual keyboard 124, and a key distance of the virtual keyboard 123 is greater than a key distance of the virtual keyboard 124.

It should be noted that the virtual keyboard parameter may include only a keyboard dimension. In this case, the distance between the keys in the virtual keyboard varies with the keyboard dimension. The virtual keyboard parameter may include a keyboard dimension and a distance between keys. The virtual keyboard parameter may include a keyboard dimension, a distance between keys, and an area of a single key. The virtual keyboard parameter may alternatively include only an area of a single key, and in this case, the keyboard dimension may not be changed, and the distance between the keys is changed by changing the area of a single key.

It should be noted that, when the distance between the center points of the adjacent virtual input elements changes, a distance between boundaries of the adjacent virtual input elements may change or may not be changed.

Step S804: The electronic device displays the virtual input element based on the parameter of the virtual input element.

After the parameter of the virtual input element is determined based on the hand parameter, the virtual input element is displayed based on the determined parameter of the virtual input element.

For example, refer to FIG. 11. It is assumed that after the parameters such as the size of the palm and the finger length of the user are obtained based on the hand image of the user, a hand model matching the hand parameter of the user and that is found from the hand model database is a hand model A, and then a virtual keyboard parameter corresponding to the hand model A is determined. In this case, the virtual keyboard parameter corresponding to the hand model A is a parameter corresponding to the virtual keyboard 113 in FIG. 11. Therefore, the virtual keyboard 113 is displayed at a corresponding location based on the virtual keyboard parameter corresponding to the hand model A.

For example, refer to FIG. 3, FIG. 4A, and FIG. 4B. After determining the virtual keyboard parameter corresponding to the hand parameter of the hand 32, the head mounted device 31 displays the virtual keyboard 313 or the virtual keyboard 315 in the virtual space.

It should be noted that, based on the solution provided in this embodiment of this application, a larger size of the hand of a user indicates a larger distance between center points of adjacent virtual input elements. That is, when a size of the hand of the user is large, a problem that fingers block each other because of a short distance between virtual input elements does not occur.

It can be seen from the foregoing that, the distance between displayed virtual input elements varies with the size of the hand of the user. In this way, a probability that fingers block each other is reduced, and recognition accuracy of an input gesture is improved.

For example, for the virtual keyboard, the dimension of the displayed virtual keyboard varies with the size of the hand of the user, that is, a virtual keyboard corresponding to the size of the hand of the user is displayed based on the size of the hand of the user, thereby reducing or even avoiding the problem that fingers block each other.

As described above, the distance between the virtual input elements displayed by the electronic device varies with the size of the hand of the user.

After the electronic device displays the virtual input element, the user may enter corresponding information by entering a gesture based on the displayed virtual input element. For example, the virtual input element is a key in a virtual keyboard. After the electronic device displays a virtual keyboard that adapts to the size of the hand of the user, the user "presses in simulation" a corresponding key in the virtual keyboard by using a finger, to enter corresponding text information.

The electronic device detects, by using a gesture recognition algorithm, whether the finger of the user is in contact with a target physical surface, to determine whether gesture input is successful. When it is detected that the finger is in contact with the target physical surface, it is determined that gesture input is successful; otherwise, when it is detected that the finger is not in contact with the target physical surface, it is determined that gesture input fails.

After determining that gesture input is successful, the electronic device displays corresponding input information in an interface.

However, in some cases, due to a problem of recognition precision of the algorithm, although the finger of the user is in contact with the target physical surface, the gesture is not effectively recognized by the algorithm, resulting in a gesture input failure.

That is, gesture input may not be successful when the finger of the user is in contact with the target physical surface.

In this case, the user can learn whether gesture input is successful only by observing whether corresponding information is displayed in the interface.

Figure 13:
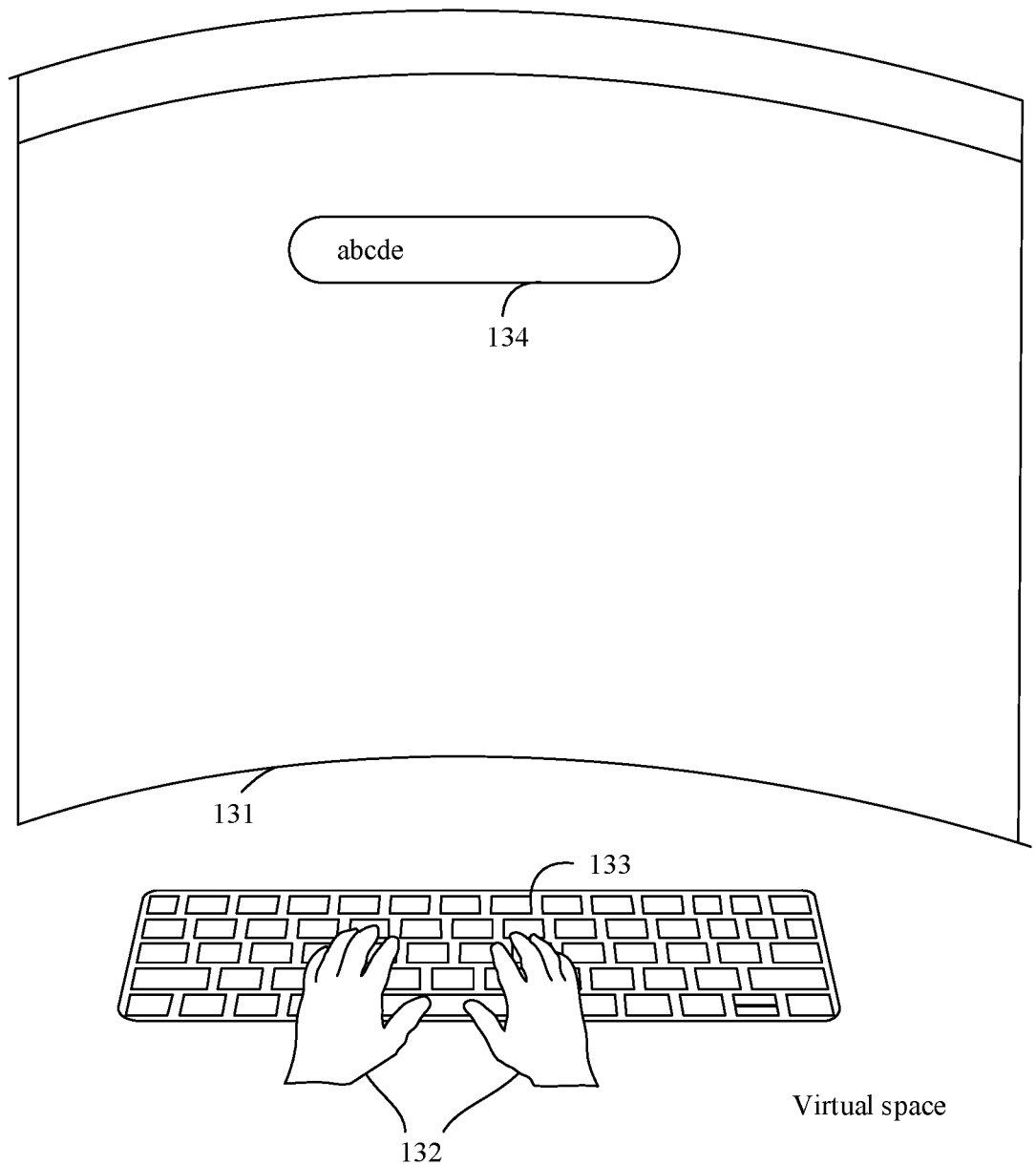
FIG. 13 is a schematic diagram of virtual space in a VR scenario according to an embodiment of this application.

For example, refer to a schematic diagram of virtual space in a VR scenario shown in FIG. 13. The virtual space in the VR scenario includes an interface 131, a virtual hand 132, a virtual keyboard 133, and an input box 134.

Based on the scenario in FIG. 3, when the hand 32 of the user is located in the detection range of the binocular camera, the head mounted device 31 displays, based on the size of the hand 32, the virtual keyboard 133 that adapts to the size of the hand 32. The virtual hand 132 is a hand model established based on the hand 32.

In FIG. 13, information entered by the user into the input box 134 in the interface 131 based on the virtual keyboard 133 is "abcde".

In a process of entering "abcde", after the user performs a "tapping in simulation" action in the physical space, the user can determine whether the current action is effectively recognized only by observing whether corresponding information is displayed in the input box 134 in the interface 131.

A manner in which the user determines, through visual observation, whether gesture input is successful reduces input efficiency of the user. Specifically, after determining, through visual observation, that gesture input fails, the user instructs the hand to perform entering again. Consequently, it is difficult for the user to form a muscle memory, and input efficiency is low.

To improve input efficiency of the user, in this embodiment of this application, feedback information may be provided to the user when it is determined that gesture input is successful. The feedback information is used to prompt the user that gesture input is successful.

The feedback information may be specifically vibration information, that is, when determining that gesture input is successful, the electronic device notifies, through vibration, the user that gesture input is successful, and the user does not need to determine, through visual observation, whether gesture input is successful.

In some embodiments, after determining that gesture input is successful, the electronic device may send a vibration instruction to another electronic device, to instruct the another electronic device to control, in response to the vibration instruction, a vibration motor to perform a vibration operation.

The another electronic device may be a controller, may be a portable electronic device such as a mobile phone or a tablet computer, or may be a wearable electronic device such as a smart band or a smartwatch. These electronic devices include vibration motors.

Figure 14:
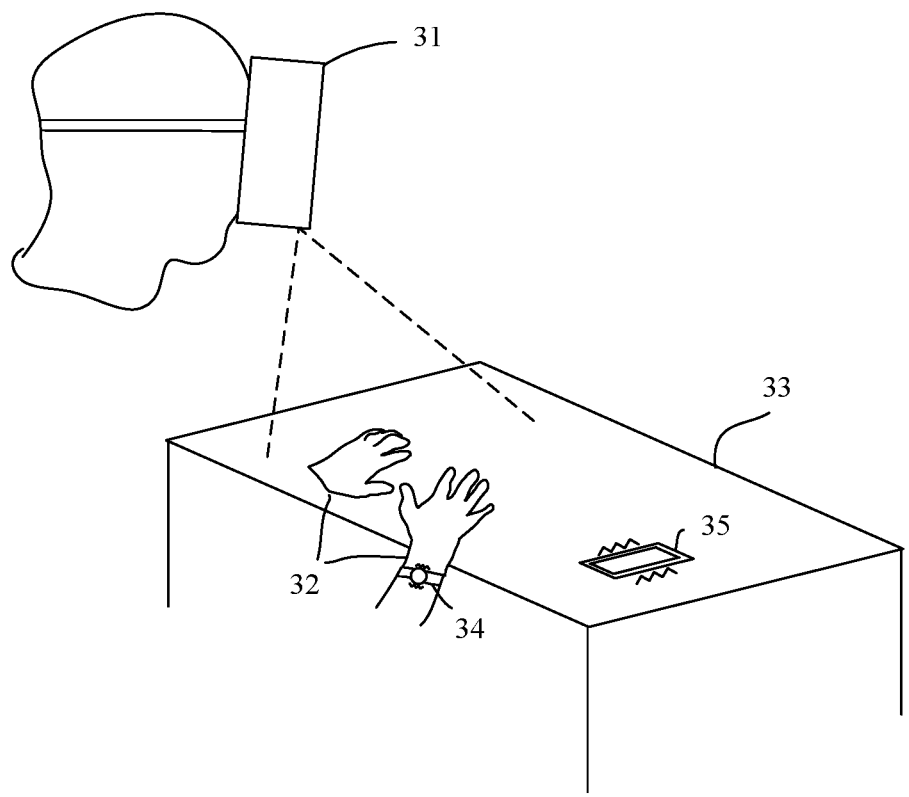
FIG. 14 is a schematic diagram of vibration feedback in a VR scenario according to an embodiment of this application.

For example, refer to a schematic diagram of vibration feedback in a VR scenario shown in FIG. 14. Based on the scenario shown in FIG. 3, after the head mounted device 31 displays, based on the size of the hand 32 of the user, the virtual keyboard that adapts to the hand 32, the user touches the target physical surface 33 by using a finger, to simulate to tap the key in the virtual keyboard by using a finger, so as to enter corresponding information.

When the user performs gesture input, the head mounted device 31 photographs a plurality of consecutive frames of images by using the built-in camera from the top-down angle, and performs gesture recognition based on the plurality of photographed consecutive frames of images.

When determining that gesture input is successful, the head mounted device 31 may send a vibration instruction to a mobile phone 35 placed on the target physical surface 33. The vibration instruction instructs the mobile phone 35 to control a vibration motor to vibrate. After receiving the vibration instruction from the head mounted device 31, in response to the vibration instruction, the mobile phone 35 controls the vibration motor to vibrate.

In this way, when the finger of the user is in contact with the target physical surface 33, whether gesture input is successful may be learned based on whether the mobile phone 35 vibrates. When the mobile phone 35 vibrates, it may be learned that a current gesture is successfully input. On the contrary, when the mobile phone 35 does not vibrate, it may be learned that the current gesture is not successfully input.

The mobile phone 35 is in communication connection with the head mounted device 31, and a connection manner may be a wired connection or a wireless connection.

In specific application, the head mounted device 31 may send a vibration instruction to the mobile phone 35 by using a communication module based on a VR software development kit (SDK). The communication module may be Bluetooth, Wi-Fi, or the like. Bluetooth is used as an example. The mobile phone 35 is paired with the head mounted device 31. After pairing succeeds, the head mounted device 31 stores pairing information of the mobile phone 35, and the pairing information may include information such as a Bluetooth device name.

After the head mounted device 31 recognizes that gesture input is successful, the head mounted device 31 sends a vibration instruction to the mobile phone 35 based on the pairing information of the mobile phone 35 by using a Bluetooth protocol.

Alternatively, the head mounted device 31 and the mobile phone 35 may be devices to which a same user account is logged in, and the head mounted device 31 and the mobile phone 35 are connected to a same Wi-Fi network. After determining that gesture input is successful, the head mounted device 31 determines that a same user account is logged in to the mobile phone 35 and the head mounted device 31, and sends the vibration instruction to the mobile phone 35 by using Wi-Fi.

In some embodiments, the electronic device may first determine whether an input feedback enabling condition is met, and if the input feedback enabling condition is met, enable an input feedback function; otherwise, if the input feedback enabling condition is not met, not enable the input feedback function.

After enabling the input feedback function, the electronic device determines whether gesture input is successful. After determining that gesture input is successful, the electronic device may send feedback information to the another electronic device, to instruct the another electronic device to perform an input success prompt operation.

For example, the input feedback enabling condition includes: A target physical surface is detected; and that a target device is placed on a target physical surface is detected. The target physical surface is a physical surface closest to a camera of the electronic device.

The scenario in FIG. 13 is used as an example. The head mounted device 31 first determines whether the input feedback enabling condition is met. Specifically, if the head mounted device 31 detects, by using a planar detection function of slam, that a distance between the physical surface 33 and the camera of the head mounted device 31 is the smallest, it is determined that the target physical surface is detected. In this case, the target physical surface is the physical surface 33.

Further, the head mounted device 31 determines whether the target device is placed on the target physical surface. In this case, the target device is, for example, a VR controller, that is, the head mounted device 31 needs to determine whether the physical surface 33 includes the VR controller (not shown in the figure).

The head mounted device 31 may recognize a spatial location of the VR controller by using a controller light strip of the VR controller. For example, the head mounted device 31 distinguishes a left controller from a right controller by controlling blinking of the controller light strip. The head mounted device 31 photographs, by using the built-in camera, an image including the VR controller, and determines, based on a controller light strip in the image, whether the spatial location of the VR controller is static on the physical surface 33.

When the physical surface 33 is detected and the VR controller is placed on the physical surface 33, the head mounted device 31 determines that the input feedback enabling condition is met, and enables the input feedback function. On the contrary, when the physical surface 33 is not detected, or it is detected that the physical surface 33 does not include the VR controller, the input feedback function is not enabled.

After enabling the input feedback function, the head mounted device 31 performs gesture recognition by using the plurality of collected consecutive frames of images.

When it is recognized that gesture input is successful, the head mounted device 31 sends feedback information to the VR controller in a Bluetooth manner by using VR controller control software. The VR controller performs a prompt operation by using a built-in control program based on the feedback information. For example, the feedback information is a vibration instruction. After receiving the vibration instruction, the VR controller controls, by using the built-in control program, a vibration motor to vibrate.

Certainly, in another implementation, the input feedback enabling condition may include: A target physical surface is detected; and that a VR controller is in a static state is detected.

Alternatively, the input feedback enabling condition may include: A virtual keyboard is displayed. That is, after displaying the virtual keyboard of a corresponding size based on the size of the hand, the head mounted device 31 automatically enables the input feedback function.

The input feedback enabling condition is not limited in this embodiment of this application.

It should be noted that the VR controller in the foregoing example may alternatively be replaced with another similar electronic device. For example, the VR controller is replaced with the mobile phone 35 or a smart band 34.

In the VR scenario shown in FIG. 14, in addition to feeding back vibration information to the user by using a device such as the mobile phone 35 and a VR controller, vibration information may be fed back to the user by using a device such as the smart band 34 worn by the user.

In this case, the head mounted device 31 performs gesture recognition based on a plurality of consecutive frames of images. When it is determined that gesture input is successful, the head mounted device 31 may send a vibration instruction to the smart band 34 by using a Bluetooth module. After receiving the vibration instruction, in response to the vibration instruction, the smart band 34 controls the vibration motor to vibrate.

Certainly, in another implementation, after determining that gesture input is successful, the head mounted device 31 may further determine whether the user wears the smart band 34. If the smart band 34 is in a worn state, that is, the user wears the smart band 34, a vibration instruction is sent to the smart band 34; otherwise, if the user does not wear the smart band 34, no vibration instruction is sent to the smart band 34.

In a specific application, the smart band 34 may detect, by using a sensor integrated into the smart band 34, whether the smart band 34 is in the worn state. For example, a physiological signal sensor is integrated into the smart band 34, and the physiological signal sensor is configured to collect a physiological signal of the user. For example, the physiological signal sensor is a heart rate sensor, and the smart band 34 collects a heart rate value of the user by using the heart rate sensor.

When the user wears the smart band 34, the smart band 34 may collect a physiological signal by using the physiological sensor, and a value of the physiological signal is not empty. Based on this, the head mounted device 31 may determine, based on whether the physiological signal collected by the smart band 34 is empty, whether the smart band 34 is in the worn state. For example, the smart band 34 collects a heart rate signal of the user by using the heart rate sensor, and transmits the collected heart rate signal to the head mounted device 31 by using Bluetooth. After receiving the heart rate signal collected by the smart band 34, the head mounted device 31 determines whether a value of the heart rate signal is empty. When the value of the heart rate signal is empty, it is determined that the smart band 34 is not in the worn state. On the contrary, when the value of the heart rate signal is not empty, it is determined that the smart band 34 is in the worn state.

Alternatively, in another implementation, after collecting the physiological signal, the smart band 34 may locally determine whether a value of the physiological signal is empty, to determine whether the smart band 34 is in the worn state. After it is determined that the smart band 34 is currently in the worn state, the smart band 34 sends first notification message to the head mounted device 31, where the first notification message is used to notify the head mounted device 31 that the smart band 34 is currently in the worn state. After receiving the first notification message from the smart band 34, the head mounted device 31 updates a status of the smart band in a local record to the worn state.

When determining, based on the detected physiological signal, that the smart band 34 is in a not-wearing state, the smart band 34 sends second notification message to the head mounted device 31. After receiving the second notification message, the head mounted device 31 updates the status of the smart band in the local record from the worn state to the non-wearing state in response to the second notification message.

In addition to determining, based on the physiological signal sensor, whether the smart band 34 is in the worn state, whether the smart band 34 is in the worn state may be further determined by using another type of sensor. For example, an infrared sensor or an acceleration sensor is integrated into the smart band, and whether the smart band is in the worn state is determined by using an acceleration signal collected by the acceleration sensor.

Alternatively, the head mounted device 31 first determines whether the head mounted device 31 is connected to the smart band 34 or the mobile phone 35, and if the head mounted device 31 is currently in a connected state, sends a vibration instruction to the smart band 34 or the mobile phone 35, to control the smart band 34 or the mobile phone 35 to vibrate.

In addition to the vibration information mentioned above, the feedback information may alternatively be another type of information. For example, the feedback information is specifically voice information. In this case, after determining that gesture input is successful, the electronic device may send a voice instruction to the another electronic device, where the voice instruction instructs the another electronic device to control a buzzer to make a preset sound.

The preset sound may be, for example, "beep". In this way, the user may learn whether gesture input is successful by hearing a sound "beep".

Certainly, after determining that gesture input is successful, the electronic device may not send a voice instruction to the another electronic device, but control a buzzer of the electronic device to make a preset sound. Alternatively, after determining that gesture input is successful, the electronic device may control a vibration motor of the electronic device to vibrate.

It should be noted that, although the electronic device determines that gesture input is successful, due to a viewpoint problem, the finger of the user may still be at a distance from the physical surface, that is, the finger of the user is not in contact with the physical surface.

Figure 15:
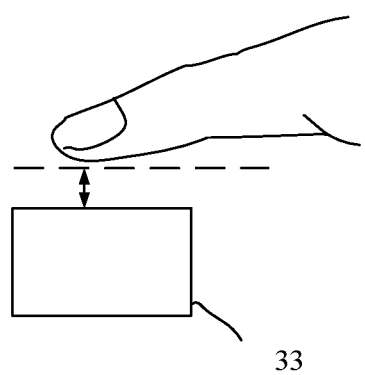
FIG. 15 is a schematic diagram of a distance between a finger and a physical surface according to an embodiment of this application.

For example, refer to a schematic diagram of a distance between a finger and a physical surface shown in FIG. 15. Based on the scenario shown in FIG. 3, when the user performs gesture input based on the virtual keyboard, the head mounted device 31 photographs the plurality of consecutive frames of images from the top-down angle, and determines, based on the plurality of consecutive frames of images, whether the gesture is successfully input.

Because the head mounted device 31 photographs the image from the top-down angle, when the head mounted device 31 performs gesture recognition based on the image, it may be determined that the gesture input is successful, but the finger of the user is not in contact with the physical desktop 33. As shown in FIG. 14, when it is determined that gesture input is successful, there is still a distance between the finger of the hand 32 and the physical surface 33, and the finger is not completely in contact with the physical surface 33.

It can be learned that, in this embodiment of this application, when it is determined that gesture input is successful, information indicating that gesture input is successful is fed back to the user, to notify the user that gesture input is successful, and the user does not need to determine, through visual observation, whether gesture input is successful, thereby improving input efficiency. In addition, when the feedback information is the vibration information, when the user "presses" the virtual input element, the user may feel a vibration on the hand to some extent, thereby improving user experience.

In some embodiments, after displaying the virtual input element based on the size of the hand of the user, the electronic device may further dynamically adjust the distance between the virtual input elements based on a proportion in which fingers block each other and/or an input speed in a process of gesture input by the user.

A blocking proportion is a ratio of a quantity of blocking times to a total quantity of times in a first preset time period.

Specifically, in the first preset time period, the electronic device collects statistics on a total quantity of gesture input times of the user, and collects statistics on a quantity of blocking times for which fingers block each other during gesture input. The gesture recognition algorithm may determine whether a time of gesture input is blocked, that is, whether the fingers block each other.

The input speed refers to a quantity of characters input in a unit time.

In specific application, in a second preset time period, the electronic device collects statistics on a total quantity of characters and letters that are successfully input, and obtains the input speed based on the total quantity and the time period.

The first preset time period and the second preset time period may be the same, or may be different.

It should be noted that, the blocking proportion and the input speed may reflect, to some extent, whether the distance between the virtual input elements adapts to the size of the hand.

Generally, when the blocking proportion is high, it indicates that for a current size of the hand, the distance between the virtual input elements is small. Therefore, the distance between the virtual input elements needs to be correspondingly increased, to decrease the blocking proportion.

When the input speed is low, it indicates that for a current size of the hand, the distance between the virtual input elements is large. Therefore, the distance between the virtual input elements needs to be correspondingly decreased, to increase the input speed.

Based on this, in some embodiments, the electronic device may determine, by determining a relationship between the blocking proportion, the input speed, and a threshold, whether the distance between the virtual input elements needs to be adjusted.

Specifically, after obtaining the blocking proportion, the electronic device determines whether the blocking proportion is greater than or equal to a first threshold, and when the blocking proportion is greater than or equal to the first threshold, increases the distance between the virtual input elements. On the contrary, when the blocking proportion is less than the first threshold, the distance between the virtual input elements is not adjusted.

After obtaining the input speed and the blocking proportion, the electronic device determines whether the input speed is less than or equal to a second threshold, and determines whether the blocking proportion is less than or equal to a third threshold. When the input speed is less than or equal to the second threshold, and the blocking proportion is less than or equal to the third threshold, the distance between the virtual input elements is decreased.

When the distance between the virtual input elements is dynamically adjusted based on the blocking proportion and the input speed, when it is determined that an adjustment condition is met, the distance between the virtual input elements is adjusted to a next level.

The adjustment condition may be that the blocking proportion is greater than or equal to the first threshold, or the input speed is less than or equal to the second threshold, and the blocking proportion is less than or equal to the third threshold.

That is, when it is determined that the blocking proportion is greater than or equal to the first threshold, the distance between the virtual input elements is adjusted upward by one level, to increase the distance between the virtual input elements.

When it is determined that the input speed is less than or equal to the second threshold and the blocking proportion is less than or equal to the third threshold, the distance between the virtual input elements is adjusted downward by one level, to decrease the distance between the virtual input elements.

The first threshold, the second threshold, and the third threshold may be set based on an actual requirement. This is not limited herein.

Each level and a distance between virtual input elements corresponding to each level may be preset; and the distance between the virtual input elements is dynamically adjusted based on the preset level, the preset distance, and the like.

For example, a virtual keyboard is used as an example. A distance between virtual input elements is adjusted by adjusting an overall dimension of the virtual keyboard.

It is assumed that a preset mapping relationship between the overall dimension of the virtual keyboard and the level includes information shown in Table 1.

TABLE 1

| Level | Overall dimension of a virtual keyboard |
|---|---|
| 1 | A |
| 2 | B |
| 3 | C |
| 4 | D |

A relationship of the overall dimension of the virtual keyboard in Table 1 is as follows: A>B>C>D.

The electronic device determines, based on a hand parameter, that the overall dimension of the virtual keyboard is C, that is, the set dimension of the virtual keyboard is C.

In a process in which the user performs gesture input based on the virtual keyboard, if the electronic device determines that the blocking proportion is greater than or equal to the first threshold, that is, the adjustment condition is met, the overall dimension of the virtual keyboard needs to be adjusted upward by one level. In this case, the dimension of the current virtual keyboard is C, and the level is 3. After being adjusted upward by one level, the overall dimension of the virtual keyboard is B, and the level is 2. After adjustment, the overall dimension of the virtual keyboard displayed by the electronic device changes from C to B, which increases a distance between keys in the virtual keyboard. By increasing the distance between the keys, a probability that fingers block each other is reduced.

Similarly, if the electronic device determines, at a moment, that the input speed is less than or equal to the second threshold and the blocking proportion is less than or equal to the third threshold, it is considered that the adjustment condition is met, and the dimension needs to be adjusted downwards by one level.

In this case, the dimension of the current virtual keyboard is C, and the level is C. After being adjusted downward by one level, the overall dimension of the virtual keyboard is D, and the level is 4. After adjustment, the overall dimension of the virtual keyboard displayed by the electronic device changes from C to D, which decreases the distance between the keys in the virtual keyboard. It should be noted that a distance adjustment rule of the virtual input element is not limited to the foregoing mentioned rule. For example, in another implementation, the distance between the virtual input elements may be further determined based on ranges in which the blocking proportion and the input speed fall. Each range corresponds to a different distance between the virtual input elements.

In some other embodiments, the distance between the virtual input elements may be adjusted only based on the input speed or the blocking proportion.

For example, when the blocking proportion is greater than a specific threshold, the electronic device increases the distance between the virtual input elements; or when the blocking proportion is less than a specific threshold, the electronic device does not adjust the distance between the virtual input elements.

For another example, when the input speed is less than a specific threshold, the electronic device may decrease the distance between the virtual input elements; or when the input speed is greater than a specific threshold, the electronic device does not adjust the distance between the virtual input elements.

It can be learned that, in this embodiment of this application, after the virtual input element is displayed based on the size of the hand of the user, the distance between the virtual input elements is dynamically adjusted based on the blocking proportion and the input speed, so that the distance between the virtual input elements adapts to the size of the hand of the user, thereby further improving gesture input efficiency and gesture recognition accuracy.

In some embodiments, the electronic device may automatically enable and disable the gesture input function. Specifically, when determining that a preset enabling condition is met, the electronic device automatically enables the gesture input function; or when determining that a preset disabling condition is met, the electronic device automatically disables the gesture input function.

When the gesture input function is enabled, a virtual input element is displayed at a corresponding location. When the gesture input function is disabled, the displayed virtual input element disappears.

For example, the preset enabling condition may include the following conditions: It is detected that the VR controller is in a static state; a target physical surface is detected; and it is detected that a distance between two hands and the target physical surface is less than a first distance threshold.

When the foregoing preset enabling condition is met, the gesture input function is automatically enabled, and the virtual input element is displayed at the corresponding location. The corresponding location may be, for example, right below the hand or a place to which the hand is about to fall.

Certainly, in another implementation, the preset enabling condition may include: A target physical surface is detected; and it is detected that a distance between two hands and the target physical surface is less than a first distance threshold. The preset enabling condition is not limited to the examples mentioned above.

For example, the preset disabling condition may include the following condition: It is detected that the distance between the two hands and the target physical surface is greater than a second distance threshold.

That is, when detecting that the distance between the two hands and the target physical surface is greater than the second distance threshold, the electronic device automatically disables the gesture input function, and removes the displayed virtual input element.

Certainly, the preset disabling condition is not limited to the examples mentioned above.

In some other embodiments, the user may alternatively manually disable and enable the gesture input function. In this case, the user may enable and disable the gesture input function by using a menu, a button, or the like.

After the gesture input function is manually enabled, the electronic device displays the virtual input element at the corresponding location. The user further needs to place the virtual input element on a detected target plane through dragging by using the controller.

In comparison, the electronic device automatically enables and disables the gesture input function, and the user does not need to enable or disable the gesture input function by using a complex operation. Therefore, user experience is high, and input efficiency is further improved.

It may be understood that, when the electronic device determines that the preset enabling condition is met, or receives an instruction for enabling the gesture input function by the user, the electronic device may obtain hand data, process the hand data to obtain a hand parameter, set a parameter of the virtual input element based on the hand parameter, and finally display the virtual input element based on the set parameter of the virtual input element.

The electronic device provided in this embodiment of this application may include a memory, a processor, and a computer program that is stored in the memory and that can be run on the processor. When executing the computer program, the processor implements the method in any one of the foregoing method embodiments.

An embodiment of this application further provides a computer-readable storage medium. The computer-readable storage medium stores a computer program. When the computer program is executed by a processor, steps in the foregoing method embodiments can be implemented.

An embodiment of this application provides a computer program product. When the computer program product runs on an electronic device, the electronic device is enabled to implement the steps in the foregoing method embodiments when executing the computer program product.

An embodiment of this application further provides a chip system. The chip system includes a processor, the processor is coupled to a memory, and the processor executes a computer program stored in the memory, to implement the method in the foregoing method embodiments. The chip system may be a single chip or a chip module including a plurality of chips.

In the foregoing embodiments, the description of each embodiment has a focus. For a part that is not described in detail or recorded in an embodiment, refer to related descriptions in other embodiments.

A person skilled in the art may clearly understand that, for the purpose of convenient and brief description, division into the foregoing function units or modules is merely used as an example for illustration. During actual application, the foregoing functions may be allocated to different function units or modules for implementation based on a requirement, that is, an inner structure of an apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software functional unit. In addition, specific names of the function units and modules are merely for ease of distinguishing between the function units and modules, but are not intended to limit the protection scope of this application. For a specific working process of the units or modules in the foregoing system, refer to a corresponding process in the foregoing method embodiments. Details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/electronic device and method may be implemented in other manners. For example, the described apparatus/electronic device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated module/unit is implemented in a form of a software functional unit and sold or used as an independent product, the integrated module/unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the method embodiments can be implemented. The computer program includes computer program code. The computer program code may be in a source code form, an object code form, an executable file form, some intermediate forms, or the like. The computer-readable storage medium may include any entity or apparatus that can carry the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, and the like. It should be noted that content included in the computer-readable storage medium may be appropriately added or deleted based on requirements of legislation and patent practice in a jurisdiction. For example, in some jurisdictions, according to legislation and patent practice, the computer-readable storage medium does not include the electrical carrier signal or the telecommunication signal.

It should be understood that sequence numbers of the steps do not mean execution sequences in the foregoing embodiments. The execution sequences of the processes should be determined based on functions and internal logic of the processes, and should not be construed as any limitation on the implementation processes of embodiments of this application.

In addition, reference to "an embodiment", "some embodiments", or the like described in the specification of this application indicates that one or more embodiments of this application include a specific feature, structure, or characteristic described with reference to embodiments. Thus, phrases "in an embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise specifically emphasized.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should further be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Likewise, the phrase "if it is determined that" or "if [a described condition or event] is detected" may be interpreted as a meaning of "once it is determined that" or "in response to determining"

or "once [a described condition or event] is detected" or "in response to detecting [a described condition or event]" depending on the context.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A virtual input element display method, comprising:
when detecting that a hand of a user is located in a detection range of a depth detector of a head mounted display device, and determining that the hand is in a process to approach a physical surface or that the hand is placed on the physical surface, displaying a virtual hand and a virtual keyboard in virtual space by using a display component of the head mounted display device, wherein the virtual hand is a virtual model of the hand;
when determining that a finger of the hand is in contact with the physical surface, displaying typed information in an interface of the virtual space in response to a typing operation of the finger of the hand, wherein a size of the hand is positively correlated with a dimension of the virtual keyboard; when the hand is of a first size, the dimension of the virtual keyboard is a first dimension; and when the hand is of a second size, the dimension of the virtual keyboard is a second dimension, wherein the first size is greater than the second size, and the first dimension is greater than the second dimension; and
determining whether to increase or decrease the dimension of the virtual keyboard based at least in part on a blocking proportion, the virtual keyboard is used for gesture input, the blocking proportion is a ratio of a quantity of times for which gesture input is blocked to a total quantity of gesture input times.

2. The method according to claim 1, wherein after the displaying a virtual keyboard in virtual space by using the display component, the method further comprises:
when determining that the finger of the hand is in contact with the physical surface, sending a prompt instruction to a target device or performing a prompt operation, wherein the prompt instruction instructs the target device to perform the prompt operation, wherein
the prompt operation comprises at least one of vibration or playing a preset sound; and
the target device comprises the head mounted display device, or an electronic device in communication connection with the head mounted display device.

3. The method according to claim 1, wherein the method further comprises:
when the blocking proportion is a first proportion, increasing the dimension of the virtual keyboard; or
when the blocking proportion is a second proportion and an input speed is a first speed, decreasing the dimension of the virtual keyboard, wherein
the first proportion is greater than the second proportion.

4. The method according to claim 1, wherein after the displaying a virtual keyboard in virtual space by using the display component, the method further comprises:
removing the virtual keyboard when determining at least one of:
that the hand is in a process to move away from the physical surface, or
that the hand is located outside the detection range of the depth detector.

5. The method according to claim 1, wherein when detecting that the hand is located in the detection range of the depth detector of the head mounted display device, and determining that the hand is in a process to approach the physical surface or that the hand is placed on the physical surface, the displaying a virtual hand and a virtual keyboard in virtual space by using the display component of the head mounted display device comprises:
when detecting that the hand is located in the detection range of the depth detector, and determining that the hand is in a process to approach the physical surface or that the hand is placed on the physical surface, obtaining a hand depth map of the band by using the depth detector;
processing the hand depth map to obtain a hand parameter, wherein the hand parameter is used to describe the size of the hand;
searching a hand model database for a target hand model matching the hand parameter;
obtaining a virtual keyboard parameter corresponding to the target hand model, wherein the virtual keyboard parameter comprises a keyboard dimension; and
displaying the virtual keyboard in the virtual space based on the virtual keyboard parameter by using the display component.

6. A virtual input element display method, comprising:
when detecting that a hand is located in a detection range of a detector, displaying at least two virtual input elements by using a display component, wherein a size of the hand is positively correlated with a distance between center points of adjacent virtual input elements in the at least two virtual input elements;
when the hand is determined to be of a first size, the distance between the center points of the adjacent virtual input elements is a first distance; and when the hand is determined to be of a second size, the distance between the center points of the adjacent virtual input elements is a second distance, wherein the first size is greater than the second size, and the first distance is greater than the second distance; and
determining whether to increase or decrease a distance between the virtual input elements based at least in part on a blocking proportion, the virtual input elements are used for gesture input, the blocking proportion is a ratio of a quantity of times for which gesture input is blocked to a total quantity of gesture input times.

7. The method according to claim 6, wherein when the hand is located in the detection range of the detector, and a distance between the hand and a physical surface is a third distance, at least two virtual input elements are displayed by using the display component.

8. The method according to claim 7, wherein the at least two virtual input elements are removed when the distance between the hand and the physical surface is determined to be of a fourth distance, or the hand is determined to be located outside the detection range of the detector, wherein the fourth distance is greater than the third distance.

9. The method according to claim 7, wherein after the displaying at least two virtual input elements by using a display component, the method further comprises:
when detecting that a finger of the hand is in contact with the physical surface, sending a prompt instruction to a target device or performing a prompt operation, wherein the prompt instruction instructs the target device to perform the prompt operation, wherein the target device comprises an electronic device, or another electronic device in communication connection with the electronic device.

10. The method according to claim 9, wherein the prompt operation comprises at least one of vibration or playing a preset sound.

11. The method according to claim 9, wherein when detecting that the finger of the hand is in contact with the physical surface, before the sending a prompt instruction to a target device, the method further comprises:
when the physical surface is detected and the physical surface comprises the target device, entering a step of sending the prompt instruction to the target device when detecting that the finger of the hand is in contact with the virtual input element.

12. The method according to claim 6, wherein after method further comprises:
when the blocking proportion is a first proportion, increasing a distance between the virtual input elements; or
when the blocking proportion is a second proportion and an input speed is a first speed, decreasing the distance between the virtual input elements, wherein
the first proportion is greater than the second proportion.

13. The method according to claim 12, wherein an obtaining process of the blocking proportion and the input speed comprises:
collecting statistics on a total quantity of gesture input times and a quantity of times for which gesture input is blocked in a preset time period;
obtaining the blocking proportion based on the total quantity of gesture input times and the quantity of times for which gesture input is blocked;
collecting statistics on a total quantity of characters successfully entered by using a virtual keyboard in the preset time period; and
obtaining the input speed based on the total quantity of characters and the preset time period.

14. The method according to claim 6, wherein when detecting that the hand is located in the detection range of the detector, displaying at least two virtual input elements by using a display component comprises:
obtaining hand data of the hand by using the detector;
processing the hand data to obtain a hand parameter, wherein the hand parameter describes the size of the hand;
searching a hand model database for a target hand model matching the hand parameter;
obtaining a parameter of a virtual input element corresponding to the target hand model, wherein the parameter of the virtual input element comprises a parameter that describes the distance between the virtual input elements; and
displaying the at least two virtual input elements based on the parameter of the virtual input element by using the display component.

15. The method according to claim 14, wherein the detector comprises an image sensor, and the hand data is a hand image; and
the processing the hand data to obtain a hand parameter comprises:
processing the hand image to obtain key point information of the hand; and
obtaining a size of a palm of the hand and a length of each finger based on the key point information of the hand, wherein the hand parameter comprises the size of the palm and the length of each finger.

16. The method according to claim 14, wherein the virtual input element is a key in a virtual keyboard; and
the obtaining a parameter of a virtual input element corresponding to the target hand model comprises:
obtaining a virtual keyboard parameter corresponding to the target hand model, wherein the virtual keyboard parameter comprises at least one of the following: a keyboard dimension, a distance between keys, or an area of a single key.

17. The method according to claim 16, wherein the size of the hand is positively correlated with a dimension of the virtual keyboard, and the dimension of the virtual keyboard is positively correlated with a size of each key in the virtual keyboard; and
when the virtual keyboard is of a first dimension, a distance between keys in the virtual keyboard is a first distance; or when the virtual keyboard is of a second dimension, the distance between the keys in the virtual keyboard is a second distance.

18. The method according to claim 6, wherein an electronic device comprises the detector and the display component; or the display component is a head mounted display device, and the detector is integrated into the head mounted display device.

19. A terminal device, comprising:
a depth detector; and
a display component; and
at least one processor; and
at least one memory, the at least one memory comprising instructions that when executed by the at least one processor, cause the terminal device to implement:
when detecting that a hand of a user is located in a detection range of the depth detector, and determining that the hand is in a process to approach a physical surface or that the hand is placed on the physical surface, displaying a virtual hand and a virtual keyboard in virtual space by using the display component, wherein the virtual hand is a virtual model of the hand;
when determining that a finger of the hand is in contact with the physical surface, displaying typed information in an interface of the virtual space in response to a typing operation of the finger of the hand, wherein a size of the hand is positively correlated with a dimension of the virtual keyboard; when the hand is of a first size, the dimension of the virtual keyboard is a first dimension; and when the hand is of a second size, the dimension of the virtual keyboard is a second dimension, wherein the first size is greater than the second size, and the first dimension is greater than the second dimension; and
determining whether to increase or decrease the dimension of the virtual keyboard based at least in part on a blocking proportion, the virtual keyboard is used for gesture input, the blocking proportion is a ratio of a quantity of times for which gesture input is blocked to a total quantity of gesture input times.

20. A non-transitory computer-readable storage medium, wherein the non-transitory computer-readable storage medium stores a computer program, and when the computer program is executed by a processor, cause a terminal device comprising a depth detector and a display component to implement:
when detecting that a hand of a user is located in a detection range of the depth detector, and determining that the hand is in a process to approach a physical surface or that the hand is placed on the physical surface, displaying a virtual hand and a virtual keyboard in virtual space by using the display component, wherein the virtual hand is a virtual model of the hand;

when determining that a finger of the hand is in contact with the physical surface, displaying typed information in an interface of the virtual space in response to a typing operation of the finger of the hand, wherein a size of the hand is positively correlated with a dimension of the virtual keyboard; when the hand is of a first size, the dimension of the virtual keyboard is a first dimension; and when the hand is of a second size, the dimension of the virtual keyboard is a second dimension, wherein the first size is greater than the second size, and the first dimension is greater than the second dimension; and determining whether to increase or decrease the dimension of the virtual keyboard based at least in part on a blocking proportion, the virtual keyboard is used for gesture input, the blocking proportion is a ratio of a quantity of times for which gesture input is blocked to a total quantity of gesture input times.

* * * * *